US007814236B2

(12) United States Patent
Tsujimoto

(10) Patent No.: US 7,814,236 B2
(45) Date of Patent: Oct. 12, 2010

(54) MULTIFUNCTION DEVICE, CONTROL DEVICE, MULTIFUNCTION DEVICE CONTROL SYSTEM, METHOD OF CONTROLLING MULTIFUNCTION DEVICE, PROGRAM, AND STORAGE MEDIUM

(75) Inventor: Kunihiko Tsujimoto, Yao (JP)

(73) Assignee: Sharp Kabushiki Kaisha, Osaka (JP)

( * ) Notice: Subject to any disclaimer, the term of this patent is extended or adjusted under 35 U.S.C. 154(b) by 890 days.

(21) Appl. No.: 11/643,323

(22) Filed: Dec. 20, 2006

(65) Prior Publication Data

US 2007/0159663 A1 Jul. 12, 2007

(30) Foreign Application Priority Data

Dec. 22, 2005 (JP) ............................. 2005-370913

(51) Int. Cl.
*G06F 3/00* (2006.01)
*G06F 3/12* (2006.01)
(52) U.S. Cl. .......................................... 710/5; 358/1.15
(58) Field of Classification Search ...................... 710/5; 358/1.15
See application file for complete search history.

(56) References Cited

U.S. PATENT DOCUMENTS

2003/0105793 A1* 6/2003 Guttag et al. ............... 708/625
2005/0046887 A1 3/2005 Shibata et al.
2006/0077427 A1* 4/2006 Zhang et al. ............... 358/1.15

FOREIGN PATENT DOCUMENTS

JP 10-111793 4/1998

* cited by examiner

*Primary Examiner*—Henry W Tsai
*Assistant Examiner*—Hyun Nam
(74) *Attorney, Agent, or Firm*—Edwards Angell Palmer & Dodge LLP; David G. Conlin; David A. Tucker

(57) ABSTRACT

A multifunction device achieves a device function by appropriately combining plural elemental functions including a scanning function, a printing function, and a communication function. The multifunction device includes: a service layer for executing the plural elemental functions; an API table storage section which stores an API table in which a first API for executing the device function is associated with a second API that the service layer can receive; and an Open I/F layer which receives the first API, specifies, in the API table, the second API corresponding to the first API, and outputs the specified second API to the service layer. With this arrangement, it is possible to provide a multifunction device which allows new control from a control device to the multifunction device to be easily developed.

15 Claims, 32 Drawing Sheets

FIG. 5

| Push button information | | Processing content information | | |
|---|---|---|---|---|
| Operation screen | Push button | UI control (next screen) | Application | Device control content |
| Scanning execution screen | OK button | | | Execute scanning |
| ... | ... | ... | ... | ... |
| Login data input screen | OK button | Screen XXX (logging in...) | Authorization application | |
| ... | ... | ... | ... | ... |

FIG. 6

| Processing request information | Processing content information | | |
|---|---|---|---|
| | UI control (next screen) | Application | Device control content |
| Authorization request | ... | Authorization application | ... |
| ... | | | |

FIG. 7

| Control content | Control instructions (order of being called) | | | | |
|---|---|---|---|---|---|
| | First | Second | Third | Fourth | |
| Scanning | JobCreate | ExecuteScan | JobClose | | ... |
| ... | ... | ... | ... | | |

FIG. 8

| Control identification information | URL |
|---|---|
| Authorization | http//www.····· |
| Automatic translation printing | http//www.····· |
| ... | ... |

FIG. 9

| First API from OSA application layer | Second API exposed in service layer (arranged in the order of being called) | | | |
|---|---|---|---|---|
| | First | Second | Third | Fourth |
| ExecuteCopy | Do Scan | Do Print | | |
| ExecuteScan | Do Scan | SaveFile | SendByFTP | |
| ExecuteFAX | Do Scan | SaveFile | SendByLine | |
| ExecutePrint | SaveFile | DoPrint | | |
| ... | ... | ... | ... | ... |

FIG. 16

```html
<html>
    <body>
        <form class="message" action="page.htm">
            <p>Scanning is ready.</p>
            <p>Push "Scanning" button to execute scanning.</p>
            <input id="id_ok" value="Scanning"/>
        </form>
    </body>
</html>
```

FIG. 17

Example of SOAP method for generating job (scanning)

```
<?xml version="1.0" encoding="utf-8"?>
<ns:Envelope xmlns:ns="http://www.w3.org/2001/12/soap-envelope">
    <ns:Body>
            <CreateJob generic="1.0" xmlns="http://www.sharp.co.jp/mfp/">
                <job-type>SCAN</job-type>
            </CreateJob>
    </ns:Body>
</ns:Envelope>
```

FIG. 21

MFP LOGIN

PLEASE ENTER YOUR CREDENTIALS:

USER NAME _____

PASSWORD _____

DOMAIN _____

CANCEL    LOGIN

FIG. 25

```
<html>
<body>
<form class="osa_menu" title="THIS IS TITLE" action="next_page.aspx ">    ···Section (A)
    <input id="id_ok"/>
    <input id="id_cancel"/>                                                ···Section (B)
    <input id="id_prev"/>
    <input id="id_exit"/>
    <fieldset title="THIS IS PROMPT TEXT">                                 ···Section (C)
        <input id="btn1" type="submit" title="BUTTON1" />
        <input id="btn2" type="submit" title="BUTTON2" />
        <input id="btn3" type="submit" title="BUTTON3" />
        <input id="btn4" type="submit" title="BUTTON4" />                  ···Section (D)
        <input id="btn5" type="submit" title="BUTTON5" />
        <input id="btn6" type="submit" title="BUTTON6" />
        <input id="btn7" type="checkbox" title="BUTTON7" selected='true'/>
        <input id="btn8" type="checkbox" submit' title="BUTTON8" />
    </fieldset>
</form>
</body>
</html>
```

FIG. 26

Menu form (Specified by class="osa_menu")

| Part information | Type of display on operation screen |
|---|---|
| Title | \<text x='5' y='2' x2='50' y2='8' >THIS IS TITLE\<text> |
| \<input id="id_ok"/> | \<button x='130' y='2' x2='145' y2='8' >OK\<text> |
| \<input id="id_cancel"/> | \<button x='110' y='2' x2='135' y2='8' >CANCEL\<text> |
| \<input id="id_prev"/> | \<button x='90' y='2' x2='105' y2='8' >BACK \<text> |
| \<input id="id_exit"/> | \<button x='70' y='2' x2='85' y2='8' >EXIT\<text> |
| | \<line x='10' y='15' x2='140' y2='10' > |
| title="THIS IS PROMPT TEXT" | \<text x='5' y='12' x2='20' y2='18'>THIS IS TITLE\<text> |
| \< input id="btn1" BUTTON1 type="submit" | \<text x='20' y='22' x2='65' y2='26'>BUTTON1\<text> |
| ... | ... |

FIG. 29

```
<Subscribe xmlns="http://www.sharp.co.jp">
    <JobId uid="JB0001"/>
    <event-type>JOB_COMPLETED</event-type>
    <url>http://192.0.0.1/event</url>
    <action>true</action>
</Subscribe>
```

FIG. 30

Event management table

| Event item | Event content | Setting |
|---|---|---|
| 1 | Completion of job | Validated |
| 2 | Error | Invalidated |
| ... | ... | ... |

FIG. 31

```
<Event generic="1.0" xmlns="http://www.sharp.co.jp" >
  <event-data>
    <details type="JOB COMPLETE">
      //Information of job
        . . .
    </details>
  </event-data>
</Event>
```

MULTIFUNCTION DEVICE, CONTROL DEVICE, MULTIFUNCTION DEVICE CONTROL SYSTEM, METHOD OF CONTROLLING MULTIFUNCTION DEVICE, PROGRAM, AND STORAGE MEDIUM

This Nonprovisional application claims priority under 35 U.S.C. §119(a) on Patent Application No. 370913/2005 filed in Japan on Dec. 22, 2005, the entire contents of which are hereby incorporated by reference.

FIELD OF THE INVENTION

The present invention relates to a multifunction device which achieves device functions by appropriately combining and executing elemental functions including an image reading function, an image forming function, and a communication function.

BACKGROUND OF THE INVENTION

Multifunction devices having functions of a photocopier, scanner, printer, facsimile machine and the like have been known. In the meanwhile, along with the development of communication networks, there has been such a technology that the multifunction device is connected to a control device constituted by a personal computer (PC) via a communication network, the control device supplies document data to the multifunction device, and the multifunction device forms a document image corresponding to the document data or the multifunction device causes the software of the PC to run.

For example, Japanese Laid-Open Patent Application No. 10-111793 (published on Apr. 28, 1998) discloses a technique which is arranged as follows. A host PC supplies menu item information including a service ID and menu display data to a multifunction device, for each of the services provided by the host PC. On the other hand, the multifunction device manages the supplied menu item information as a menu table, and displays the menu items on the operation panel. Then, in response to the input by the user, the multifunction device determines which menu item has been selected, and supplies the selection result to a control device. The control device executes an application corresponding to the notified selection result. In response to the execution of the application, functions such as a scanning function and a printer function of the multifunction device are activated from the control device side.

As described above, Japanese Laid-Open Patent Application No. 10-111793 (published on Apr. 28, 1998) teaches that a function of the multifunction device is activated from the host PC side, in response to the execution of an application. However, different multifunction devices have different sets of functions.

FIG. 32 shows a conventional multifunction device. As shown in this figure, the multifunction device 101 includes an OS layer 15, a driver layer 14, a service layer 13, an application layer 12, and a user interface layer 11. These layers are unique to the multifunction device 101, and hence different types of multifunction devices have different sets of layers.

Even if the same function is shared between plural multifunction devices, these devices may process the shared function in different ways. For this reason, in case where control of the multifunction device in accordance with an application is performed by a control device, the control device is required to chose a control command suitable for the type of the multifunction device. As a result, the efficiency in the development of a new application by which the control device controls the multifunction device is deteriorated.

Japanese Laid-Open Patent Application No. 10-111793 (published on Apr. 28, 1998) teaches that a multifunction device manages a menu table regarding display menus. In this case, when a control device controls the multifunction device in accordance with a new application, it is necessary to add a corresponding new menu item. If it is necessary to input a parameter for the control, a screen for the input must be displayed on an operation panel of the multifunction device. The multifunction device must therefore manage data for the input screen. As a result, in case where a control device controls the multifunction device in accordance with a new application, corresponding menu items, data of the input screen, and a program for displaying the data must be provided in the multifunction device, which is very troublesome.

SUMMARY OF THE INVENTION

The present invention was done to solve the above-identified problem. The objective of the present invention is to provide a multifunction device, a control device, a multifunction device control system, a controlling method of the multifunction device, a program, and a storage medium, which allow new control on the multifunction device by a control device to be easily developed.

To achieve the objective above, a multifunction device, which achieves a device function by appropriately combining plural elemental functions including a communication function and at least one of an image reading function and an image forming function, includes: elemental function executing means for executing said plural elemental functions; a command storage section in which a first control command for executing the device function is associated with a second command function that the elemental function execution means is able to receive; and control command converting means for receiving a first control command, specifying, in the command storage section, a second control command corresponding to the first control command, and outputs the specified second control command to the elemental function executing means.

Examples of the elemental functions of the multifunction device include a scanning function, printing function, an image processing function, and a network function. Examples of the device function achieved by appropriately combining those elemental functions and executing them include: a copying function which is achieved by combining the scanning function, the image processing function, and the printing function and executing them; and an image transmission function which is achieved by combining the scanning function with the network function and executing them.

Different types of multifunction devices may have different elemental functions. For example, a multifunction device A has only the scanning function and the printing function, whereas a multifunction device B has the copying function in addition to the scanning function and the printing function. In such a case, to achieve the copying function as the device function, the multifunction device A is required to combine and execute the scanning function and the printing function, whereas the multifunction device B is required only executing the copying function which is one of the elemental functions. Moreover, different types of multifunction devices may have different elemental function executing means for executing the same elemental functions.

It is difficult to share the elemental functions between all types of multifunction devices, because it is necessary to produce various types of multifunction devices according to the needs of the users. In other words, the elemental function executing means is typically unique to each type of the multifunction device.

Because of the reason above, second control commands that the elemental function executing means can receive are typically different between different types of multifunction devices. (In other words, second control commands typically depend on the types of the multifunction devices.)

However, according to the disclosure above, the control command converting means receives a first control command, specifies, in the command storage section, the second control command corresponding to the first control command, and outputs the specified second control command to the elemental function executing means. According to this arrangement, the first control commands that the control command converting means can receive are independent of the types of the multifunction devices (i.e. shared between all types of the multifunction devices), even if the second control commands depend on the types of the multifunction devices.

That is to say, the first control commands do not depend on the type of the multifunction device, whereas the second control commands depend on the type of the multifunction device.

Therefore, in case where the multifunction device is controlled by an external control device, the control device outputs, to the multifunction device, a first control command independent of the types of the multifunction devices or a control instruction based on which such a first control command is generated. As a result, when new control is performed on a multifunction device by a control device, the control device is developed so as to generate a first control command shared between multifunction devices or a control instruction based on which such a first control command is generated. The control device is therefore easily developed.

Additional objects, features, and strengths of the present invention will be made clear by the description below. Further, the advantages of the present invention will be evident from the following explanation in reference to the drawings.

BRIEF DESCRIPTION OF THE DRAWINGS

FIG. 5 shows an example of a push button—processing content table provided in an information accepting section of the control device.

FIG. 6 shows an example of a processing request—processing content table in the information accepting section of the control device.

FIG. 7 shows an example of a control instruction table stored in an instruction table storage section of the control device.

FIG. 8 shows an example of URL registration information stored in a UI service layer of the multifunction device.

FIG. 9 shows an example of an API table in an Open I/F layer of the multifunction device.

FIG. 16 shows an example of operation screen data for displaying the scanning execution screen of FIG. 15.

FIG. 17 shows an example of an SOAP method for the control command "Job Create".

FIG. 21 shows an example of a login data input, screen.

FIG. 25 shows an example of operation screen data.

FIG. 26 shows UI data which is generated by converting the operation screen data shown in FIG. 25 into a format suitable for the operation panel of the multifunction device.

FIG. 29 shows an example of event transmission registration information.

FIG. 30 shows an example of an event management table.

FIG. 31 shows an example of a job result notification.

DESCRIPTION OF THE EMBODIMENTS

The following will describe an embodiment of the present invention with reference to FIGS. 1-31. A multifunction device control system of the present embodiment is arranged so that an application of a control device operates in cooperation with a multifunction device. FIG. 2 outlines the multifunction device control system of the present embodiment. As shown in this figure, the multifunction device control system includes a multifunction device 1, a control device 2, and a communication network which connects these devices so as to allow them to communicate with one another. The multifunction device 1 may be connected to plural control devices, as illustrated in FIG. 2.

The multifunction device 1 has plural image forming functions such as copying, scanning (image reading function), printing (image forming function), transmission of image data (communication function), and image conversion. The multifunction device 1 is, for example, a device (MFP: Multifunction Printer) in which a printer, a photocopier, a facsimile machine, a scanner, and a calculating device performing image transmission, conversion, and image processing are combined. The multifunction device 1 is not required to have all of those functions. An alternative multifunction device 1 may have a scanning function (image reading function) and a communication function, or a print function (image forming function) and a communication function.

Figure 3:
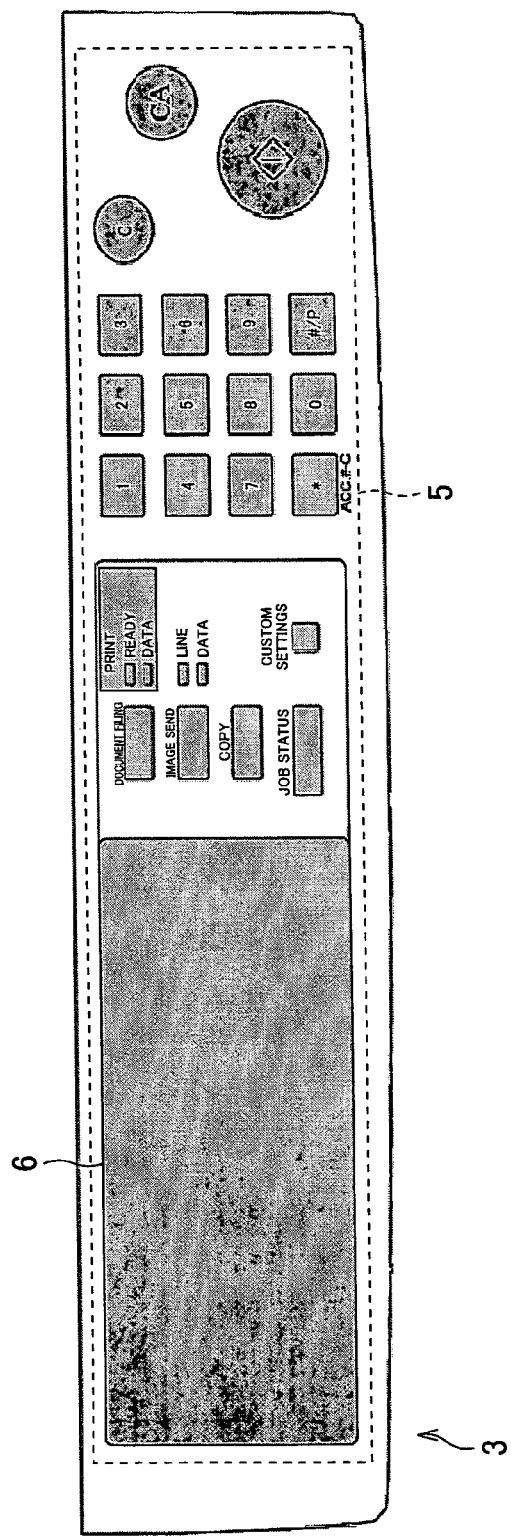
FIG. 3 is an enlarged view of an operation section of the multifunction device.

The function device 1 has, as a user interface, an operation section 3. FIG. 3 is a magnified view of the operation section 3. As shown in this figure, the operation section 3 has an operation panel 6 on which an operation screen is displayed for the user, and an input section 5 which receives inputs from the user. The operation panel 6 adopts a touch panel system, and hence functions as the input section 5, too.

Instead of the operation section 3 or in addition to the operation section 3, the multifunction device 1 may be connected to a UI device. In such a case, the operation screen is displayed on the UI device connected to the multifunction device 1.

The control device 2 is, for example, a personal computer. Various applications are installed in the control device 2. The control device 2 can therefore perform processes in accordance with the respective applications, and communicate with the multifunction device 1 over a communication network. Examples of the communication network include the Internet, a telephone network, serial cables, and other wired and wireless lines.

The control device 2 controls the functions of the multifunction device 1, via the communication network. To control the multifunction device 1, the control device 2 executes a process using an application installed therein. The multifunction device 1 is therefore controlled by the control device 2 so that control using various processes which cannot be executed by the information processing functions of the multifunction device 1 can be achieved. In other words, the multifunction device 1 can operate in cooperation with an application in an external control device 2.

To control various features of the multifunction device 1, the applications in the control device 2 may utilize one or more Web services provided by the multifunction device 1. There are various types of control of features of the multifunction device 1 such as, for example, validation/invalidation of a function of the device, setting of a function of the device, and the control of functions of the device. An Web service is program processing which allows, over a network, an external device to use functions of an application. The Web service typically uses SOAP format.

As shown in FIG. 2, in case where the multifunction device 1 is connected to plural control devices 2 in which different applications are installed, the number of applications in cooperation with which the multifunction device 1 operates is increased. As a result it is possible to control the multifunction device 1 in various ways.

The multifunction device 1, when operating in cooperation with an application in the control device 2, accesses the control device 2 which is a Web server, obtains operation screen data corresponding to the application, and causes the operation panel 6 to display the operation screen. In other words, an application of the control device 2 can interact with the user. Therefore, the multifunction device 1 can display the operation screen only by requesting the control device 2 to send operation screen data, and hence the multifunction device 1 is not required to manage the operation screen data.

All types of multifunction devices 1 use the same APIs (Application Program Interface) (control instructions) which are exposed to external devices. Each control device 2 can therefore output shared control instructions to any types of multifunction devices 1. For this reason, a program embedded in the control device 2 can be easily developed for controlling the multifunction device 1 using a new application. An API is a code defining instructions used for software development and procedures for using the instructions.

The multifunction device 1 and the control device 2 use, for communications in regard of request/response to the operation screen data, HTTP or HTTPS using SSL (Secure Socket Layer). The adoption of HTTPS improves security. Other examples of markup languages are HTML (Hypertext Markup Language), XML (eXtensible Markup Language), WML (Wireless Markup Language), and XHTML (eXtensible Hypertext Markup Language).

XML is a description language with a document structure by which data transmission can be conducted as easy as HTML. The advantages of XML are: (1) the user can define the meaning of a character string in a document; (2) the language does not depend on any particular software; and (3) programming is easy.

The communication of control instructions in case where the control device 2 controls the multifunction device is carried out using an inter-object communication protocol using a markup language such as XML. A typical example of such a protocol is SOAP (Simple Object Access Protocol). SOAP is a protocol for calling data and services, created based on XML, HTTP, and the like. SOAP enables systems to cooperate with one another.

The following will discuss in what manner the multifunction device 1 and the control device 2 are arranged.

(Control Device)

Figure 4:
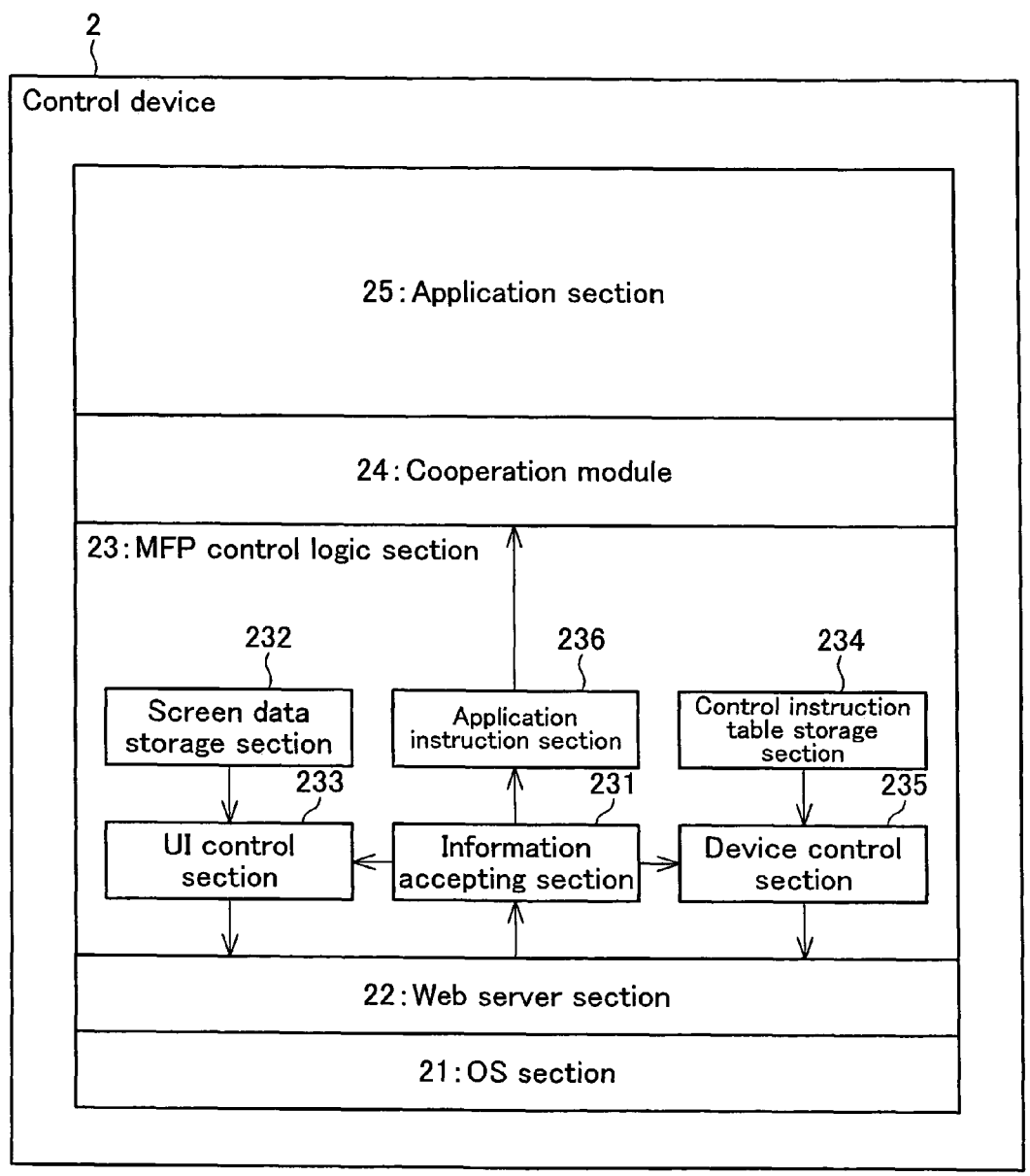
FIG. 4 is a block diagram showing a control device of the embodiment.

FIG. 4 is a block diagram showing the internal arrangement of the control device 2 of the present embodiment. As shown in FIG. 4, the control device 2 includes an OS section 21, a Web server section 22, an MFP control logic section 23, a cooperation module 24, and an application section 25.

The OS section 21 is a block which manages a computer system and performs processes in accordance with an operating system (OS) that provides a basic user operational environment. Examples of the OS are Windows® and Linux.

The Web server section 22 performs communication using HTTP (Hypertext Transfer Protocol) (or HTTPS) and SOAP (Simple Object Access Protocol). The Web server 22 receives an HTTP request from the multifunction device 1, and transmits an HTTP response corresponding to the supplied HTTP request. The Web server 22 is, for example, a block which operates in accordance with software such as Apache.

The MFP control logic section 23 controls the operation screen (UI) and various device functions of the multifunction device 1. The MFP control logic section 23 includes an information accepting section (request information accepting section) 231, a screen data storage section 232, a UI control section (screen data transmitting means) 233, a control instruction table storage section 234, a device control section (control instruction transmitting means) 235, and an application instruction section 236.

The information accepting section 231 receives information from the multifunction device 1 via the Web server section 22, and instructs the UI control section 233, the device control section 235, and the application instruction section 236 to perform processes corresponding to the supplied information.

Examples of the information supplied from the multifunction device 1 to the information accepting section 231 include a transmission request information (request information) regarding data specified by a URL (Uniform Resource Locator), push button information indicating if a button has been pushed on the operation screen based on the operation screen data supplied from the UI control section 233, and processing request information for requesting the application section 25 to perform a process.

The information accepting section 231 obtains the processing request information from the Web server section 22, by means of SOAP. Also, the information accepting section 231 obtains the transmission request information and the push button information from the Web server section 22, by means of HTTP (or HTTPS).

Examples of the processing request information includes, for example, information which requests an authorization application to authorize the user, and information which requests an event tabulation application to tabulate data. Any types of the processing request information other than the aforesaid examples can be used, on condition that the information is optionally (or regularly) supplied from the multifunction device 1 and the application section 25 performs a process based on the information.

Receiving the transmission request information, the information accepting section 231 supplies the transmission request information to the UI control section 233.

In addition, the information accepting section 231 manages a push button—processing content table in which push button information indicating whether a button on the operation screen has been pushed or not is associated with processing information indicating a process which is performed in response to the push of the button, by any one of the UI control section 233, the application instruction section 236, and the device control section 235.

FIG. 5 shows an example of the push button—processing content table. As shown in the figure, the information accepting section 231 indicates that, for example, push button information indicating that "OK button" on the operation screen "scanning execution screen" is associated with process content information indicating the device control with a control content "scanning execution".

Also, push button information indicating that "OK button" of the operation screen "login data input screen" is associated with processing content information indicating that the UI control section 233 transmits, for the next screen, data of a screen XXX (indicating "logging in") to the multifunction device 1, and starts an authorization application.

Receiving the push button information, the information accepting section 231 specifies, in the push button processing table, the processing content information corresponding to the supplied push button information. Also, the information accepting section 231 instructs the UI control section 233, the application instruction section 236, and the device control section 235 to execute a process indicated by the specified processing information. That is, in case where the processing content information relates to the UI control, the information accepting section 231 notifies the UI control section 233 of the content indicated by the information. In case where the processing content information relates to an application, the information accepting section 231 notifies the application instruction section 235 of the content indicated by the information. In case where the processing content information relates to the device control, the information accepting section 231 notifies the device control section 235 of the content indicated by the information.

In a similar manner with the push button processing table, the information accepting section 231 manages a processing request information—processing content table in which processing request information to the application section 25 is associated with processing content information indicating the processing content performed by one of the UI control section 233, the application instruction section 236, and the device control section 235 in response to the processing request information.

FIG. 6 shows an example of the processing request—processing content table. As shown in the figure, processing request information indicating a request for authorization is associated with processing content information which indicates that the application instruction section 236 instructs the authorization application to start the authorization process.

Receiving the processing request information, the information accepting section 231 specifies, in the processing request—processing content table, the processing content information corresponding to the supplied processing request information. Also, the information accepting section 231 instructs the UI control section 233, the application instruction section 236, and the device control section 235 to execute the process indicated by the specified processing content information.

The screen data storage section 232 stores operation screen data indicating an operation screen displayed on the operation panel 6 of the multifunction device 1.

The UI control section 233 reads out, from the screen data storage section 232, the operation screen data corresponding to the instruction of the information accepting section 231, and outputs the operation screen data to the multifunction device 1 via the Web server section 22. The UI control section 233 transmits the operation screen data, by means of HTTP (or HTTPS).

The application instruction section 236 causes the application section 25 to start a predetermined process, in response to the content of the instruction from the information accepting section 231.

The control instruction table storage section 234 stores a control instruction table in which the control content for the multifunction device 1 is associated with the control instruction which is made in case where the control in accordance with the aforesaid control content is performed. As shown in FIG. 7, the control instruction table storage section 234 stores, for instance, the control content "scanning" in association with the control instructions "JobCreate", "ExecuteScan", and "JobClose". In case where the control instruction table storage section 234 stores plural control instructions in association with a single control content, the order of output (order of control) of the control instructions is also stored.

As described below, the control instructions stored in the control instruction table storage section 234 are APIs which are disclosed to the outside by the Web service layer 17 of the multifunction device 1. These APIs are shared between all types of the multifunction devices 1.

The device control section 235 reads out, from the control instruction table storage section 234, a control instruction corresponding to the control content supplied from the information accepting section 231 or the application section 25. The device control section 235 then supplies the control instruction to the multifunction device 1 via the Web server section 22. The device control section 235 uses SOAP to supply the control instruction to the multifunction device 1.

The application section 25 is a block which performs processes corresponding to various applications. The application section 25 operates in accordance with, for example, an authorization application which identifies users registered in advance, a document management application which stores and manages image data, an OCR (Optical Character Recognition) application, a translation application, and an event tabulation application which tabulates the events executed by the multifunction device 1.

The cooperation module 24 connects the application section 25 with the MFP control logic section 23. The cooperation module 24 supplies an instruction from the application instruction section 236 to the application section 25, and also supplies an instruction from the application section 25 to the device control section 235.

(Multifunction Device)

Figure 1:
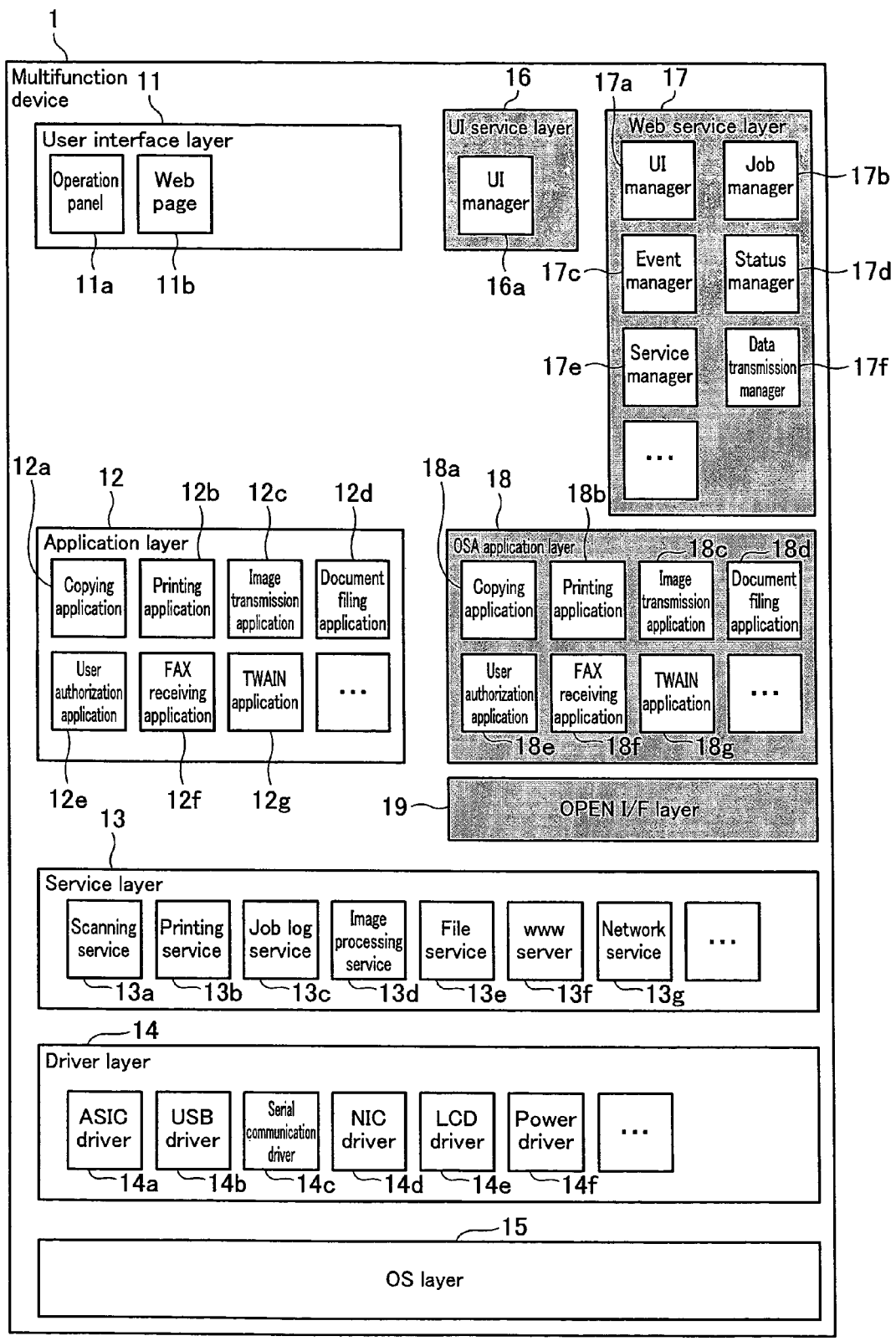
FIG. 1 is a block diagram illustrating a multifunction device of an embodiment of the present invention.
Figure 2:
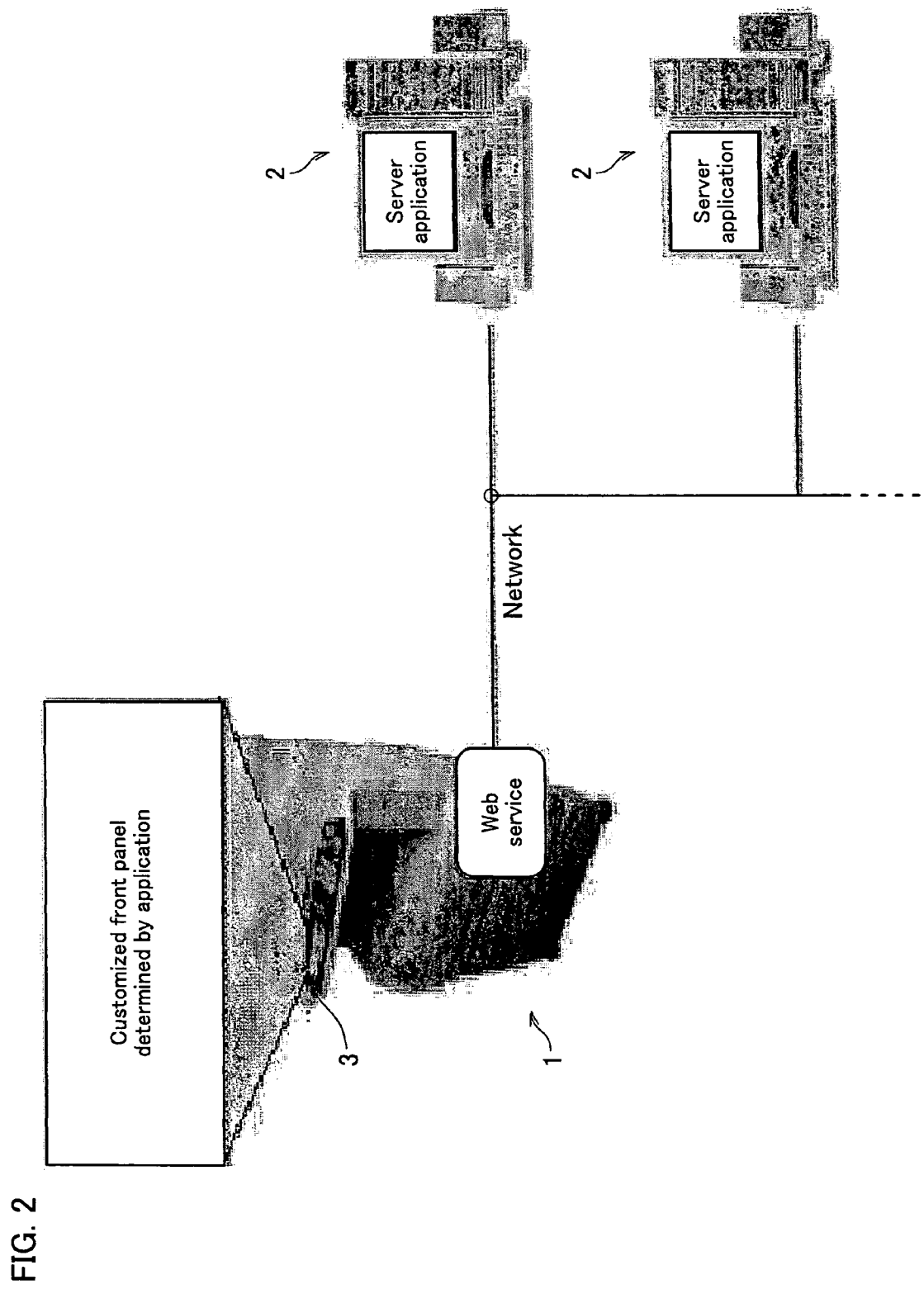
FIG. 2 is an image formation system of the embodiment of the present invention.

The following will describe the internal arrangement of the multifunction device 1, with reference to the block diagram in FIG. 1. As shown in this figure, the multifunction device 1 includes a user interface layer 11, an application layer 12, a service layer (elemental function executing means) 13, a driver layer 14, an OS layer 15, a UI service layer (UI processing means, operation screen identification information storage section, screen table storage section) 16, a Web service layer (control instruction receiving means) 17, an OSA application layer (device function control means) 18, and an Open I/F layer (control command converting means, command storage section, registration information management section, determining means) 19.

The user interface layer 11 is provided for allowing the user to operate the multifunction device 1. The user interface layer 11 stores an operation screen (unique operation screen) unique to the multifunction device 1, and causes the operation panel 6 to display the unique operation screen. The user controls the multifunction device 1 by instructing the unique operation screen to execute a desired function.

An operation panel section 11a of the user interface layer 11 supplies, to the application layer 12, the information inputted through the operation screen of the multifunction device 1.

A Web page section 11b supplies, to the application layer 12, information inputted to a Web page.

The application layer 12 operates in accordance with applications which control various device functions of the multifunction device 1.

The device functions are functions achieved by appropriately combining elemental functions such as a scanning function, a printing function, an image processing function, and a network function. Examples of such device functions achieved by appropriately combining elemental functions include a copying function in which the scanning function, the image processing function, and the printing function are combined with one another, and an image transmission function in which the scanning function is combined with the network function.

The application layer 12 of the present embodiment includes a copying application 12a for executing/controlling the copying function, a printing application 12b for executing/controlling the printing function, an image transmission application 12c for executing/controlling a function (image transmission function) by which scanned image data is transmitted to an external device, a document filing application 12d for executing/controlling the document filing function, a user authorization application 12e for executing/controlling the user authorization function, a FAX receiving application 12f for executing/controlling the FAX receiving function, a TWAIN application 12g for executing/controlling the TWAIN function, and the like.

The service layer 13 is provided below the application layer 12, and controls various elemental functions of the multifunction device 1 in response to an instruction from the application layer 12.

As the elemental functions, the service layer 13 of the present embodiment is provided with services such as: a scanning service 13a for controlling a scanning operation; a print service 13b for controlling printing, which is used in the printing function and copying function; a job log service 13c for controlling the information management of each job; an image processing service 13d for controlling image formation such as image generation; a file service 13e for controlling management of images, such as document filing; a WWW server service 13f which performs control for remote access via a Web page; and a network service 13g for controlling communication operations, using LAN, telephone lines, or the like.

The driver layer 14 is provided below the service layer 13, and operates in accordance with software which controls the hardware of the multifunction device 1.

Examples of the driver layer 14 of the present embodiment includes: an ASIC driver 14a regarding image formation; a USB driver 14b for USB communications; a serial communication driver 14c for serial communications; a NIC driver 14d for LAN communications; an LCD driver 14e for controlling the display on the operation panel 6; and a power driver 14f for power management.

The OS layer 15 is provided below the driver layer 14, and manages the operating system.

The user interface layer 11, the application layer 12, the service layer 13, the driver layer 14, and the OS layer 15 operate in accordance with software unique to the multifunction device 1, and hence different multifunction devices 1 have different layers. With those layers, the multifunction device 1 can directly receive an instruction from the user without the intermediary of a communication network, and can operate in accordance with the instruction.

However, in case where the multifunction device 1 only has those layers unique to the same, it is necessary, to perform a process using a new application, to install the new application or the like into the multifunction device 1. Since this installation is tiresome, the multifunction device 1 of the present embodiment is provided with, as shown below, a layer which cooperates with an application in an external control device 2 so as to allow the multifunction device 1 to accept the control by the control device 2.

The UI service layer 16 obtains, by means of HTTP (or HTTPS), operation screen data from the control device 2, and displays, on the operation panel 6, the operation screen based on the obtained operation screen data. The UI service layer 16 may have functions of a general-purpose Web browser.

Because of the UI service layer 16 and the user interface layer 11, the user operates the operation screen of the operation panel 6 so as to use either a standard operation mode or open system modes. In the standard operation mode, a function corresponding to the input to the operation screen (displayed by the user interface layer 11) unique to the multifunction device 1 is executed by the multifunction device 1. In the open system modes, a network resource (e.g. an application in a remote control device) is used.

The UI service layer 16 is provided with a UI manager which controls the display of the UI (operation screen) supplied from the control device 2.

The UI service layer 16 stores URL registration information in which control identification information (e.g. control name indicating the control of the control) for identifying control accompanied with the processing by the application section 25 of the control device 2 is associated with a URL (operation screen identification information) of the operation screen which is displayed for receiving the control. In other words, the UI service layer 16 is provided with a URL registration information storage section (operation screen identification information storage section; not illustrated) which stores the aforesaid URL registration information. FIG. 8 is an example of the URL registration information. The UI service layer 16 newly registers or deletes URL registration information, in response to a user input to the input section 5 or an instruction from the Web service layer 17.

The UI manager 16a of the UI service layer 16 displays, on the operation panel 6, the list of control identification information registered in the URL registration information. Furthermore, the UI manager 16a reads out, from the URL registration information, a URL corresponding to the control identification information selected by the user, and supplies, to the control device 2, transmission request information requesting the operation screen data specified by the URL, by means of HTTP (or HTTPS). The UI manager 16a then displays, on the operation panel 6, the operation screen based on the obtained operation screen data. Thereafter, the UI manager 16a supplies, to the control device 2, push button information indicating which button on the operation screen has been pushed, by means of HTTP (or HTTPS). In response to the push button information, the UI manager 16a receives new operation screen data, and displays operation screen based on this data, on the operation panel 6.

The Web service layer 17 receives a control instruction supplied from the control device 2, by means of SOAP, and calls an appropriate module, of the OSA application layer 18, which corresponds to the control instruction. The Web service layer 17 generates an SOAP command which indicates the information supplied from the OSA application layer 18, and sends the SOAP command to the control device 2. The Web service layer 17 stores control instructions in association with modules of the OSA application layer 18, which modules correspond to respective controls indicated by the control instructions. An appropriate module is called in accordance with the stored content.

The Web service layer 17 of the present embodiment includes: a UI service for processing a Web service regarding UI control; a job manager 17b for processing a Web service regarding job control; an event manager 17c for processing a Web service regarding an event transmission request; a status manager 17d for processing a Web service regarding status control of jobs and devices; a service manager 17e for registering information regarding the OSA application layer 18; a data transmission manager 17f for processing a Web service used for transmission and receiving of jobs; and the like.

The OSA application layer 18 is an application for controlling the aforesaid device functions. The OSA application layer 18 generates a first API (first control command) for controlling an elemental function used for the device function to be controlled, and sends the first API to the Open I/F layer 19. As described below, the first APIs which can be used in (i.e. exposed to) the Open I/F layer 19 are shared between all types of the multifunction devices 1. For this reason, it is unnecessary in the OSA application layer 18 to change program codes for each multifunction device 1. The OSA application layer 18 outputs, to the Open I/F layer 19, the first APIs exposed in the Open I/F layer 19.

The OSA application layer 18 of the present embodiment includes: a copying application 18a for executing/controlling the copying function; a printing application for executing/controlling the printing function; an image transmission application 18c for executing/controlling a function (image transmission function) to send scanned image data to an external device; a document filing application 18d for executing/controlling the document filing function; a user authorization application 18e for executing/controlling the user authorization function; a facsimile receiving application 18f for executing/controlling the facsimile receiving function; a TWAIN application 18g for executing/controlling the TWAIN function; and the like.

The Open I/F layer 19 has a function to expose, to the OSA application layer 18, an interface for controlling the service layer 13. Also, the Open I/F layer 19 converts the first API, which has been supplied from the OSA application layer 18, into a second API (second control command) that the service layer 13 can receive.

The Open I/F layer 19 has an API table storage section (command storage section; not illustrated) in which the first APIs (i.e. first control commands that the Open I/F layer 19 can receive from the outside) are associated with the corresponding second APIs (i.e. second control commands that the service layer 13 can receive) exposed to the outside by the service layer 13. Using the API table, the Open I/F layer 19 calls an API in the service layer 13. FIG. 9 shows an example of the API table of the Open I/F layer 19.

In the Open I/F layer 19, the first APIs exposed to the OSA application layer 18 (i.e. APIs that the Open I/F layer 19 can receive) are shared between all types of multifunction devices 1. On this account, it is unnecessary in the OSA application layer 18 to change program codes, and methods exposed to external devices by the Web service layer 17 are commonly defined irrespective of the types of the multifunction devices 1. That is, the control devices 2 can make a request to the Web service layer 17 using common methods, irrespective of the types of the multifunction devices 1.

Figure 18:
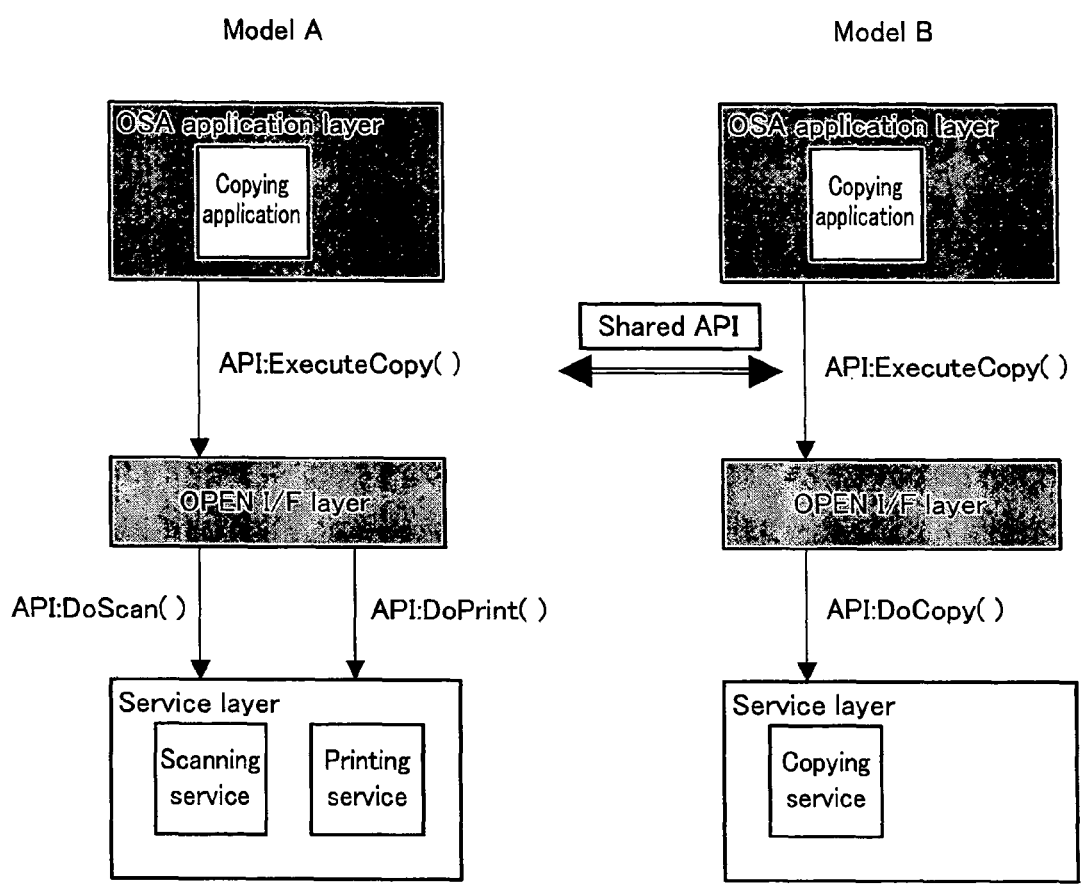
FIG. 18 illustrates the functions of an Open I/F layer.

FIG. 18 illustrates the functions of the Open I/F layer 19. As shown in FIG. 18, the multifunction device 1 of the model A has, as the service layer 13, the scanning service 13a and the printing service 13b. In this case, as shown in FIG. 9, the Open I/F layer 19 of the multifunction device 1 of the model A has the API table in which the first API "Execute Copy" is associated with the second APIs "Do Scan" and "Do Print". The Open I/F layer 19 can therefore execute the scanning service 13a and the printing service 13b in response to the first API "Execute Copy".

On the other hand, the multifunction device 1 of the model B has, as the service layer 13, a copying service. In this case, the Open I/F layer 19 of the multifunction device 1 of the model B has the API table in which the first API "Execute Copy" is associated with the second API "Do Copy". The Open I/F layer 19 can therefore execute the copying service in response to the first API "Execute Copy".

In this manner, the Open I/F layer 10 is capable of converting APIs with reference to the API table. All types of the multifunction devices 1 can therefore share the first API exposed in the Open I/F layer 19. As a result, the layers above the Open I/F layer 19 can use shared APIs. In other words, external control devices 2 can output shared control instructions to any types of the multifunction devices 1.

(Registration Process of URL Registration Information)

The following will describe a process of registering URL registration information in the UI service layer 16. This registration process is carried out either by using the operation panel 6 of the multifunction device 1 or in response to a request from an external personal computer.

(Example of Registration Process Using Operation Panel)

Figure 10:
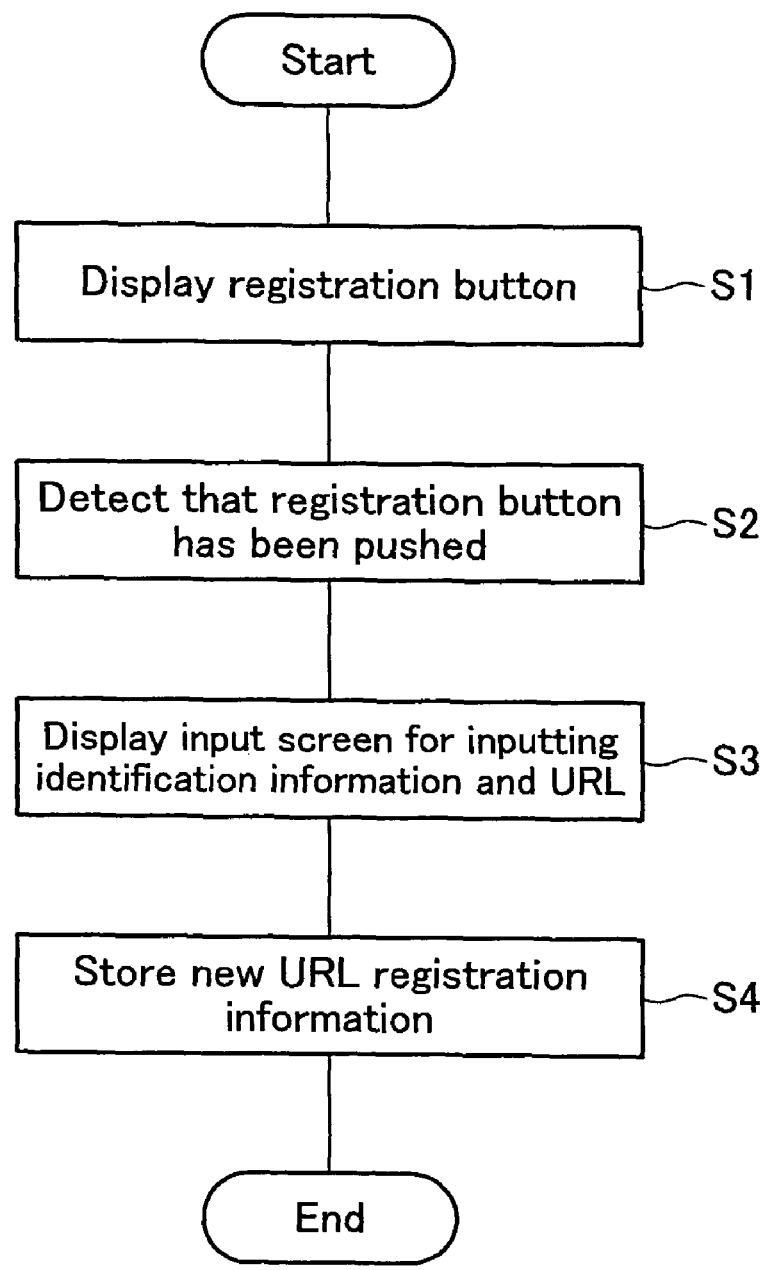
FIG. 10 is a flowchart illustrating the registration process of the URL registration information, using the operation panel of the multifunction device.

First, the registration process using the operation panel 6 will be discussed with reference to the flowchart in FIG. 10.

The UI manager 16a of the UI service layer 16 displays, on the operation panel 6, a registration button for new URL registration information (S1). The UI manager 16a then detects that the registration button has been pushed (S2).

Thereafter, the UI manager 16a displays, on the operation panel 6, an instruction to input (i) control identification information (e.g. a name which clearly signify a control content) by which control accompanied with a process performed by the application section 25 of the control device 2 is identified and (ii) the URL of the operation screen for the aforesaid control (S3).

The UI manager 16*a* then generates new URL registration information in which the control identification and the URL which are supplied to the input section 5 are associated with one another, and stores the generated URL registration information in the UI service layer 16*a* (S4). The registration process finishes after this step.

The UI manager 16*a* may display an editing button and a delete button on the operation panel 6. When the editing button is pushed, the UI manager 16*a* edits the registered URL registration information, in response to the input to the input section 5 by the user. When the delete button is pushed, the UI manager 16*a* deletes the registered URL registration information, in response to the input to the input section 5 by the user.

EXAMPLE 1 OF REGISTRATION PROCESS IN RESPONSE TO REQUEST FROM EXTERNAL PERSONAL COMPUTER

The following will describe a concrete example where new URL registration information is registered on the multifunction device 1 from an external personal computer.

Figure 11:
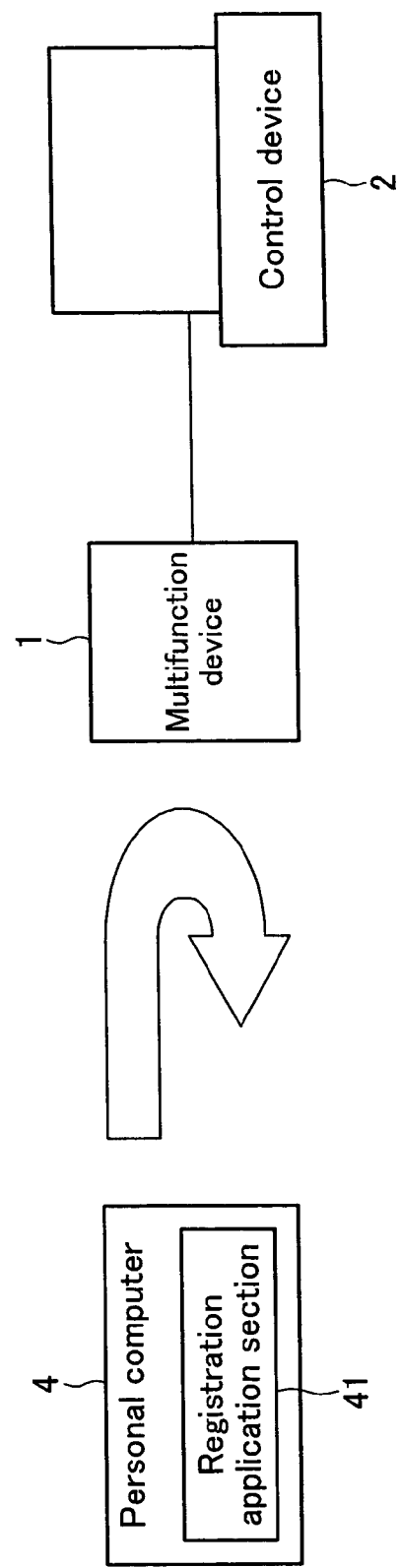
FIG. 11 shows devices used in an example where the URL registration information is registered from a personal computer.

FIG. 11 shows devices in this concrete example. As shown in this figure, a communication network connects a personal computer 4 including a registration application section 41, a multifunction device 1, and a control device 2 including an application section 25 which operates in cooperation with the multifunction device 1. In this example, URL registration information indicating control which is accompanied with a process by the application section 25 of the control device 2 is newly registered in the multifunction device 1.

Figure 12:
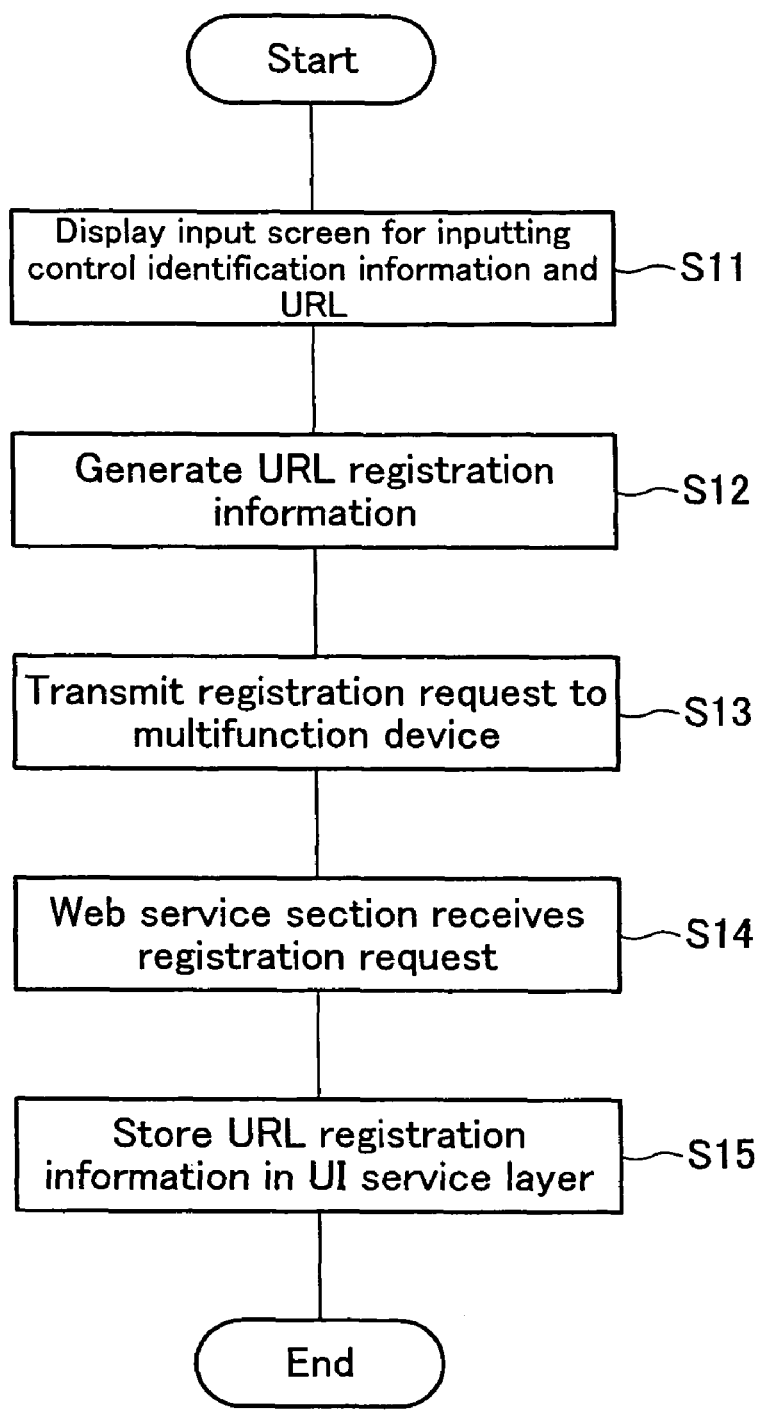
FIG. 12 is a flowchart showing a registration process in case where the URL registration information is registered from an external personal computer.

FIG. 12 is a flowchart showing the flow of the registration process of the URL registration information in the present example.

First, the registration application section 41 of the personal computer 4 prompts the user to input (i) control identification information (e.g. a name which clearly signify a control content) by which a control accompanied with a process performed by the application section 25 of the control device 2 is identified and (ii) the URL of the operation screen for the aforesaid control (S11). The registration application section 41 then generates URL registration information in which the supplied control identification information and URL are associated with one another (S12).

Thereafter, the registration application section 41 supplies, by means of SOAP and to the multifunction device 1, a registration request to which the generated URL registration is added (S13).

The Web service layer 17 of the multifunction device 1 receives the registration request (S14). The UI manager 17*a* of the Web service layer 17 stores, in the UI service layer 16, the URL registration information added to the registration request (S15). New URL registration information is registered in this manner.

New URL registration information is registered on the multifunction device 1 from the external personal computer 4, as outlined above. Dealers of applications can therefore remotely register URL registration information on the multifunction devices 1, without operating the operation panels 6 of those multifunction devices 1.

The UI manager 17*a* may edit or delete the registered URL registration information, in response to a request from the personal computer 4.

In this way, the UI manager 17*a* functions as registering/editing means for the URL registration information.

EXAMPLE 2 OF REGISTRATION PROCESS IN RESPONSE TO REQUEST FROM EXTERNAL PERSONAL COMPUTER

The above-described example 1 of the registration process is effective in case where dealers of applications register new URL registration information. The present concrete example is effective in case where the URL registration information having been registered on a currently-used multifunction device 1 is registered on a newly-purchased multifunction device 1.

In the example 1, the registration application section 31 of the personal computer 1 generates URL registration information in response to the user input. On the other hand, in the present example, the registration application section 41 requests plural multifunction devices 1 on the communication network to transmit registered URL registration information, and obtains the URL registration information from those multifunction devices 1.

Figure 13:
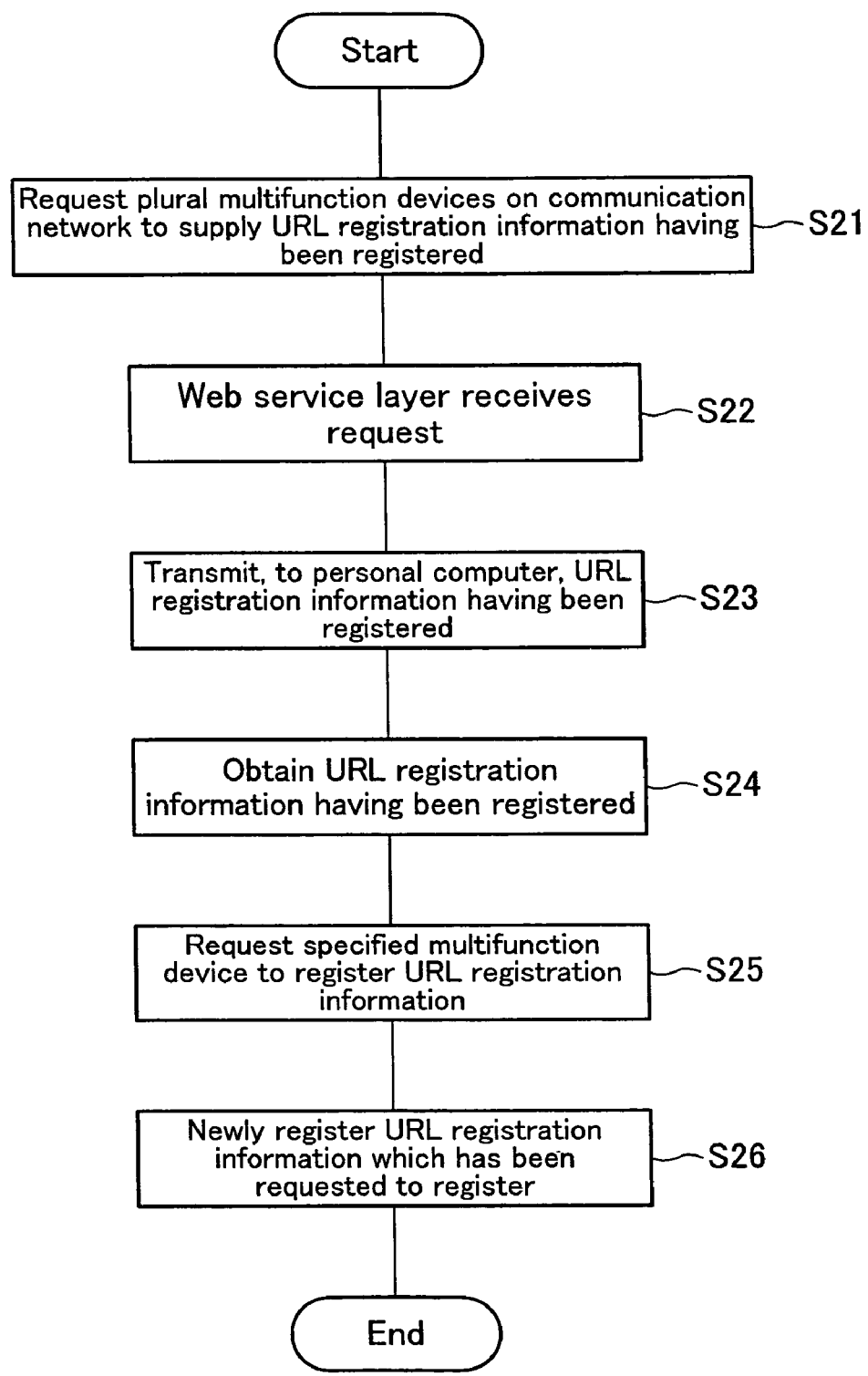
FIG. 13 is a flowchart showing another registration process in case where the URL registration information is registered from an external personal computer.

The flow of a registration process in the present example will be discussed with reference to the flowchart in FIG. 13.

First, the registration application section 41 requests, by mean of SOAP, plural multifunction devices 1 on the communication network to transmit registered URL registration information (S21).

The Web service layer 17 of each multifunction device 1 receives the transmission request, via the NIC driver 14*d* of the driver layer 14, the network service 13*g*, and WWW server 13*f* of the service layer 13 (S22).

In response to the transmission request, the status manager 17*d* of the Web service layer 17 reads out all URL registration information from the UI service layer 16, and supplies the URL registration information to the PC, by means of SOAP (S23). In other words, the status manager 17*d* functions as notifying means for notifying an external personal computer 4 of URL registration information.

The registration application section 41 of the personal computer 4 obtains, from the multifunction devices 1, registered URL registration information (S24).

Thereafter, the registration application section 41 supplies, by means of SOAP and to a multifunction device 1 specified by the user (in this case, a newly-purchased multifunction device 1), a registration request to which either all pieces of the URL registration information obtained from the multifunction devices 1 or user-selected pieces of the URL registration information are added (S25).

The Web service layer 17 of the user-specified multifunction device 1 then receives the registration request. The UI manager 17*a* of the Web service layer 17 stores, in the UI service layer 16, the URL registration information added to the supplied registration request (S26). In this wise, on this multifunction device 1, the URL registration information registered in another multifunction device 1 is registered.

CONCRETE EXAMPLE 1 IN CASE OF OPERATION IN COOPERATION WITH EXTERNAL APPLICATION: DOCUMENT MANAGEMENT APPLICATION

The following will describe a concrete example 1 where URL registration information is registered on the multifunction device 1 in the manner as above, and the multifunction device 1 operates in cooperation with an external application, with reference to the URL registration information.

The present example illustrates a case where image data scanned by the multifunction device 1 is stored by a document management application in a control device 2. In this case, stored in the UI service layer 16 of the multifunction device 1 is URL registration information in which control identification information "Document Management" is associated with a URL of operation screen data indicating an operation screen for the cooperation with a document management application.

Figure 14:
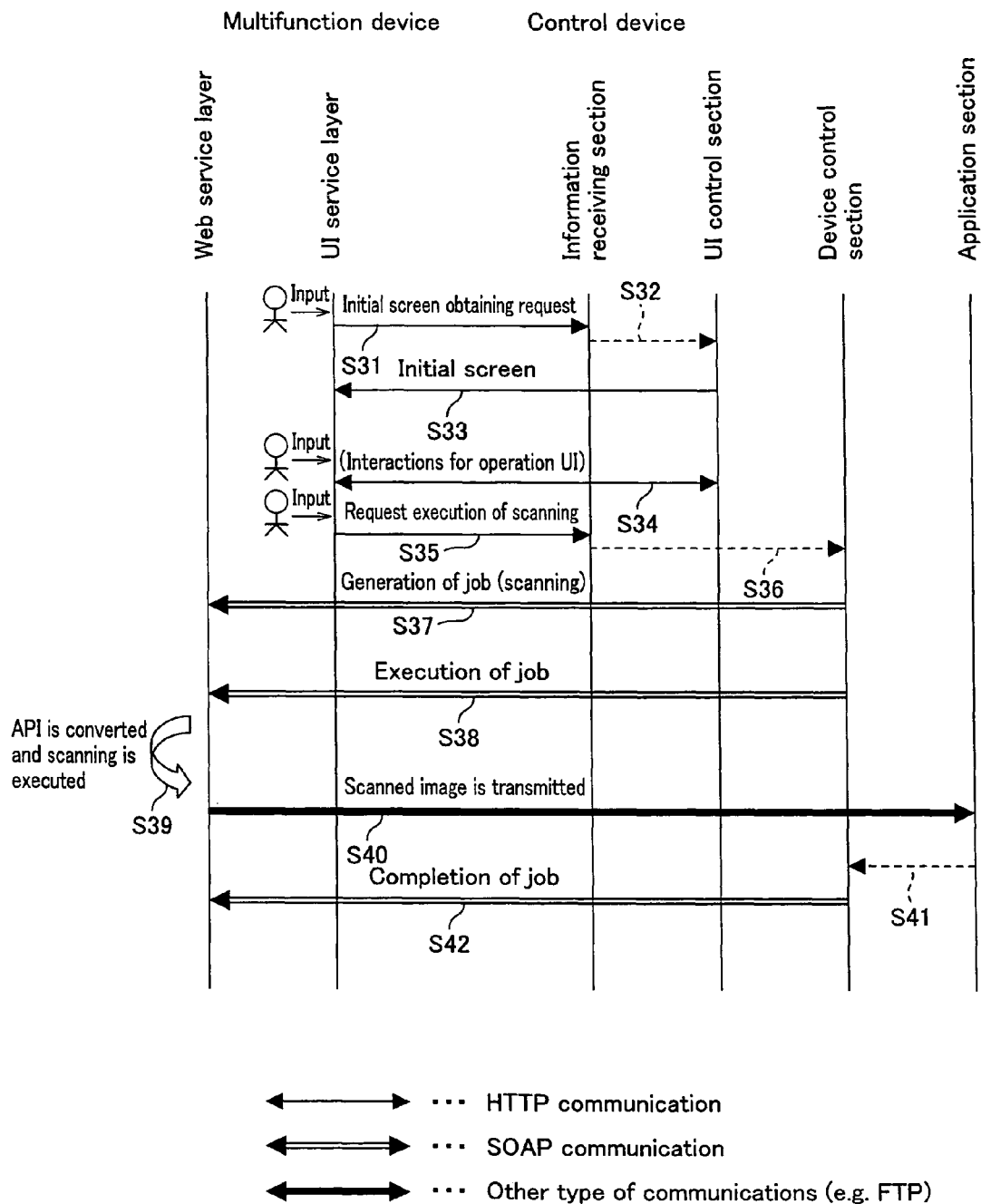
FIG. 14 illustrates the flow of processing steps in case where the scanning control is carried out by the control device.

FIG. 14 illustrates the flow of a process in the present example.

First, the UI manager 16a of the UI service layer 16 displays, on the operation panel 6, the list of URL registration information stored in the UI service layer 16. Provided that the user selects control identification information "Document Management", the UI manager 16a specifies, in the URL registration information, a URL corresponding to the control identification information "Document Management". Thereafter, the UI manager 16a supplies, to the control device 2, a transmission request which requests transmission of the data specified by the URL (in this case, the data is initial operation screen data for the control indicated by the control identification information "Document Management") (S31). This request from the UI manager 16a is performed by means of HTTP (or HTTPS).

The information accepting section 231 of the control device 2 receives the transmission request information, and supplies the information to the UI control section 233 (S32).

The UI control section 233 reads out, from the screen data storage section 232, the operation screen data corresponding to the URL specified in the transmission request information. In the present case, the UI control section 233 reads out operation screen data indicating a screen for inputting login information for logging in the document management application. Thereafter, in response to the transmission request information, the UI control section 233 returns the operation screen data thus read out to the multifunction device 1, by means of HTTP (S33).

In the multifunction device, the UI manager 16a of the UI service layer 16 receives the operation screen data, and displays, on the operation panel 6, an operation screen based on the operation screen data (i.e. an input screen for inputting login information for logging in the document management application). Details of the displaying process of the operation screen, which is carried out by the UI manager 16a, will be given later.

Thereafter, the UI manager 16a of the multifunction device 1 and the information accepting section 231 and the UI control section 233 of the control device 2 conduct a changing process of the operation screen (S34).

More specifically, when the OK button on the screen for inputting the login information is pushed, the UI manager 16a supplies, to the control device 2 and by means of HTTP, the login information thus input as well as push button information indicating that the OK button has been pushed. Receiving the push button information, the information accepting section 231 instructs the application instruction section 236 in such a manner as to cause the document management application to start a login authorization process, with reference to the push button—processing content table. Thereafter, the document management application, which has confirmed successful authorization, causes the UI control section 233 to output operation screen data indicating a selection screen for selecting the destination to store the image data. As a response to the transmission of the push button information, the UI control section 233 supplies the operation screen data to the multifunction device 1.

In this way, the UI manager 16a of the multifunction device 1 and the information accepting section 231 and the UI control section 233 of the control device 2 cause the operation screen to change to a selection screen for selecting the destination to store image data, a setting screen for setting a scanning execution parameter, an input screen for inputting metadata, and a scanning execution screen.

When a scanning execution button is pushed in the scanning execution screen which is the last operation screen, the UI manager 16a supplies, to the control device 2 and by means of HTTP, push button information which indicates that the scanning execution button has been pushed (S35).

Figure 15:
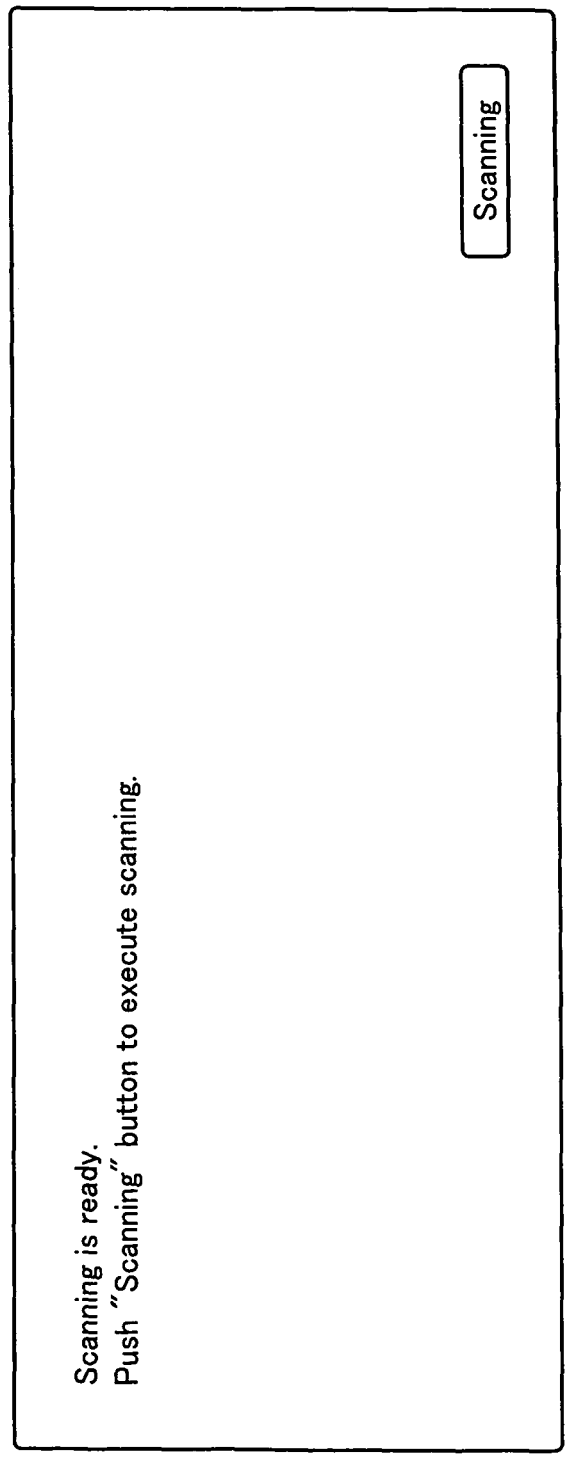
FIG. 15 shows an example of a scanning execution screen.

FIG. 15 shows an example of the scanning execution screen. FIG. 16 shows an example of operation screen data indicating the scanning execution screen of FIG. 15.

In this case, the UI manager 16a transmits push button information indicating that a scanning execution button (id="id_ok") has been pushed.

Upon being notified that the scanning execution button (id="id_ok") has been pushed, the information accepting section 231 of the control device 2 instructs the device control section 235 to generate a control instruction corresponding to a control content "Scan", with reference to the push button—processing content table (FIG. 5) (S36).

The device control section 235 reads out, from the control instruction table storage section 234, the control instruction corresponding to the control content "Scan", and supplies the control instruction to the multifunction device 1, by means of SOAP. For example, provided that the control instruction table shown in FIG. 7 is used, the device control section 235 outputs the control instructions "JobCreate" and "ExecuteScan" in this order (S37, S38). To the control instruction "ExecuteScan", various parameters set by the UI are added.

The device control section 235 transmits the control instructions by means of SOAP. FIG. 17 shows an example of an SOAP method for job generation (scanning).

In the meanwhile, in the multifunction device 1 having received the control instructions by means of SOAP, the job manager 17b of the Web service layer 17 calls an appropriate module in the OS application layer 18, in response to the control instruction "ExecuteScan". Scanning is then carried out as below (S39).

The job manager 17b stores a table in which a control instructions is associated with a module in the OSA application layer 18, which module is used for performing a control instructed by the control instruction. In the present case, the job manager 17b stores a table in which the control instruction "ExecuteScan" is associated with the image transmission application in the OSA application layer 18. The job manager 17b therefore causes the multifunction device 1 to execute the image transmission application 18c in the OSA application layer 18. In doing so, the job manager 17b outputs, to the image transmission application 18c, various parameters added to the control instruction.

Thereafter, the image transmission application 18c outputs, to the Open I/F layer 19 on the lower level, a first API ("ExecuteScan" in this case) which is exposed to the outside by the Open I/F layer 19.

The Open I/F layer 19 reads out, from the API table (see FIG. 9), second APIs ("Do Scan", "Save File", and "Send By FTP" in this case) that the service layer 1 can receive and that corresponding to the first API ("ExecuteScan" in this case) supplied from the OSA application layer 18 (image transmission application 18c in this case). Then the Open I/F layer 19 outputs those second APIs to the service layer 13, in the order in which they are stored in the API table. In response to the second APIs, the service layer 13 causes the multifunction device 1 to execute elemental functions (scanning service, filing service, and network service in this case). In doing so, the service layer 13 run appropriate modules in the driver layer 14.

The service layer 13 then scans an image (S39), and supplies the scanned image data to the control device 2, by means of FTP (S40).

More specifically, first, the Open I/F layer 19 supplies the second APIs "Do Scan" and "Save File" to the service layer 13. The service layer 13 stores the scanned image data in a hard disc drive or memory in the multifunction device 1, and notifies the image transmission application 18c of the location of the image data. The image transmission application 18c notifies the Open I/F layer 19 of the aforesaid location. Thereafter, the Open I/F layer 19 supplies to the service layer 13, a second API "Send By FTP" which indicates that the image data stored in the notified location will be transmitted by means of FTP. With this, the file service 13e and the network service 13g of the service layer 13 are carried out so that the image data is read out from the indicated location and transmitted to the specified destination by means of FTP.

In the control device 2, the cooperation module 24 and the document management application of the application section 25 wait for the image data. The cooperation module 24 supplies the received image data to the document management application. The document management application performs a process to store the image data in a folder which is specified as the storing destination by the UI.

As the document management application finishes the aforesaid process, the application section 25 notifies the device control section 235 that the process has been finished (S41). In response to the notification, the device control section 235 transmits the last control instruction "JobClose" to the multifunction device 1 (S42), and then the process finishes.

As described above, the multifunction device 1 specifies the URL which has already been registered so as to obtain from the control device 2 the operation screen data for using the document management information, and hence can cause the operation panel 6 to display the operation screen. Based on the information input in the operation screen, the MFP control logic section 23 and the application section 25 of the control device 2 controls the operation screen on the operation panel 6 of the multifunction device 1, and controls the elemental functions of the multifunction device 1.

In addition to the aforesaid control instructions "JobCreate", "ExecuteScan", and "JobClose", the device control section 235 may output a control instruction to set a job parameter and a control instruction to interrupt or stop the execution of a job, in response to inputs to the operation screen by the user.

CONCRETE EXAMPLE 2 IN CASE OF OPERATION IN COOPERATION WITH EXTERNAL APPLICATION: AUTHORIZATION APPLICATION

This concrete example deals with a case where the multifunction device 1 operates in cooperation with an authorization application in the control device 2. That is to say, The control device 2 carries out an authorization process in which whether the user of the multifunction device 1 is an authorized user is determined, and the control device 2 restricts the device functions of the multifunction device 1, in accordance with the result of the authorization.

Before the present concrete example is discussed, the following will describe a comparative example for comparison with the present example.

Figure 19:
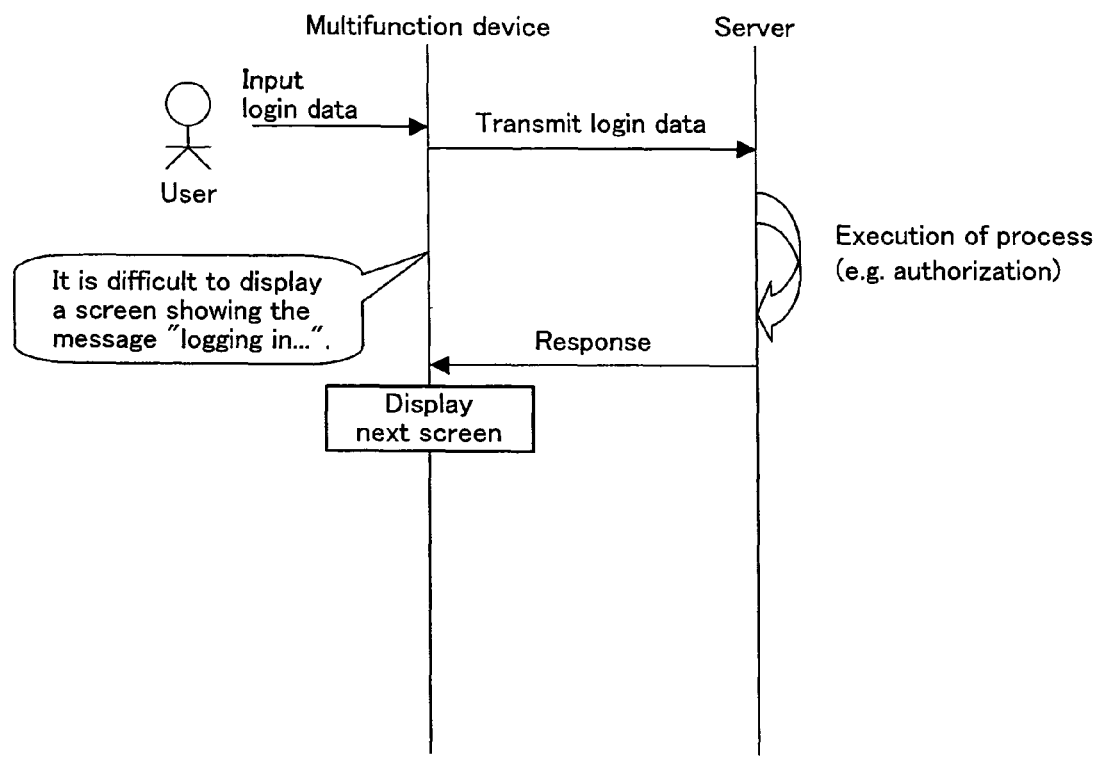
FIG. 19 shows the flow of an authorization process in a comparative example for comparison with the embodiment.

FIG. 19 shows the flow of an authorization process in the comparative example where communication is carried out only by HTTP. According to HTTP, an HTTP request and an HTTP response are paired. That is, as a client sends an HTTP request to the server, the server returns, to the client, the HTTP response corresponding to the HTTP request. The server cannot send any data to client, unless an HTTP request is supplied therefrom. On the other hand, the client cannot receive any data unless the client sends an HTTP request to the server.

As shown in FIG. 19, in the comparative example, in response to login data supplied from the multifunction device 1 (client), the server sends next operation screen data to the multifunction device 1 after the authorization finishes. In this case, the user cannot see the next screen until the authorization process finishes, and hence the user may feel anxious if the authorization process is properly carried out. It is therefore necessary to display a screen showing a message such as "logging in" on the operation panel 6 of the multifunction device 1. However, in the comparative example, the next operation screen data cannot be supplied to the multifunction device 1, if the screen showing the message "logging in" is returned in response to the login data. This is because the operation screen data cannot be returned without a request from the multifunction device 1.

Figure 20:
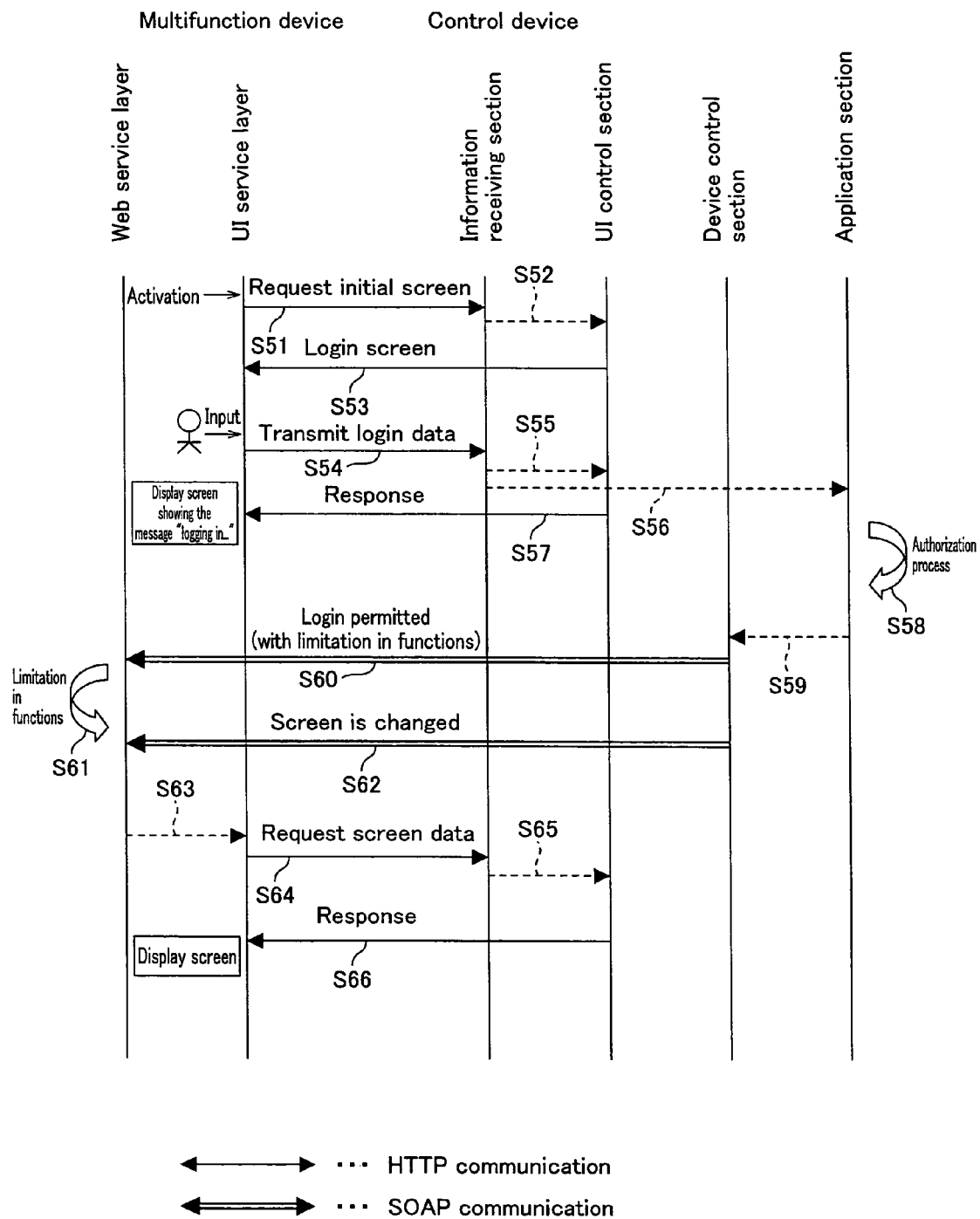
FIG. 20 shows the flow of Example 4 (authorization process) of the embodiment.

In the present embodiment, in case where the application section 25 of the control device 2 performs a process in response to a HTTP request from the multifunction device 1, the operation screen on the operation panel 6 of the multifunction device 1 can be changed while the aforesaid process is performed. The present concrete example is suitable for explaining this advantage. FIG. 20 shows the flow of an authorization process in the present example.

In the multifunction device 1, first, a display process on the operation panel 6 starts. On this occasion, the UI manager 16a of the UI service layer 16 specifies, in the URL registration information registered in the UI service layer 16, a URL corresponding to control identification information "Authorization Control", and outputs, to the control device 2, transmission request information by which data indicating the operation screen specified by that URL is requested (S51).

In the control device 2, the information accepting section 231 supplies the transmission request information to the UI control section 233 (S52). The UI control section 233 returns, to the multifunction device 1, the operation screen (login data input screen in this case) specified by the supplied transmission request information (S53).

In the multifunction device 1, the UI manager 16a of the UI service layer 16 displays the login data input screen, based on the received operation screen data. FIG. 21 shows an example of the login data input screen.

The user inputs login data and pushes the OK button. In response to the input, the UI manager 16a supplies, to the control device 2, the input login data and push button information indicating that the OK button has been pushed (S54).

Receiving the push button information, the information accepting section 231 instructs the UI control section 233 to transmit an operation screen showing the phrase "logging in", in reference to the push button—processing content table (FIG. 5) (S55), and instructs the application instruction section 236 to start the processing of the authorization application (S56).

In line with the instruction in S55, the UI control section 233 reads out, from the screen data storage section 232, the data of the operation screen showing the phrase "logging in", and sends the data to the multifunction device 1 (S57).

On the other hand, in line with the instruction in S56, the application instruction section 236 activates the authorization application. The authorization application carries out an authorization process, using an authorization database which has been registered in advance (S58).

Succeeding the authorization process, the authorization application outputs, to the device control section 235, (i) a control content "Restriction of Elemental Functions" indicating the restriction on the use of the elemental functions of the multifunction device 1 and (ii) a control content "Screen Change" indicating that a current screen is changed to a predetermined operation screen (S59). These control contents thus output correspond to the login user.

The authorization application stores the information of use restriction of elemental functions, with respect to each login user. For example, in case where a user A is prohibited to conduct color printing, the user A and the prohibition of color printing are associated with one another in advance in the authorization application, by the administrator.

The device control section 235 then obtains, from the control instruction table storage section 234, a control instruction ("Restriction of Elemental Functions") corresponding to the control content "Restriction of Elemental Functions", and outputs the obtained control instruction ("Restriction of Elemental Functions") to the multifunction device 1 (S60).

Receiving this control instruction, ("Restriction of Elemental Functions"), in the multifunction device 1, the service manager 17e of the Web service layer 17 calls the user authorization application 18e in the OSA application layer 18. In line with the control instruction, the user authorization application 18e sends, to the Open I/F layer 19, a first API for controlling the restriction of the elemental functions of the service layer 13. The Open I/F layer 19 converts the first API supplied from the user authorization application 18e into a second API that the service layer 13 can receive. The Open I/F layer 10 makes the instruction to the service layer 13 in this way.

As a result, for example, the elemental functions are restricted so that the printing service 13b in the service layer 13 cannot perform color printing and the maximum number of copies is limited to five (S61).

The device control section 235 obtains, from the control instruction table storage section 234, a control instruction ("Screen Change") corresponding to the control content "Screen Change", and outputs the control instruction ("Screen Change") to the multifunction device 1 (S62). To this control instruction ("Screen Change"), a URL corresponding to the next operation screen is added.

Receiving the control instruction ("Screen Change"), in the multifunction device 1, the UI manager 17a of the Web service layer 17 instructs the UI service layer 16 to display the operation screen specified by the URL added to the control instruction (S63).

By means of HTTP, the UI manager 16a of the UI service layer 16 outputs, to the control device 2, transmission request information by which operation screen data specified by the URL is requested (S64). In the control device 2, the information accepting section 231 supplies the transmission request information to the UI control section 233 (S65). The UI control section 233 supplies, to the multifunction device 1, the operation screen data corresponding to the URL specified in the transmission request information (S66), so that the multifunction device 1 displays the operation screen on the operation panel 6.

VARIANT EXAMPLE OF CONCRETE EXAMPLE 2

In the above-described concrete example 2, the UI service layer 16 of the multifunction device 1 obtains data of login data input screen from the control device 2, causes the operation panel 6 to display the login data input screen, and obtains login data from the input section 5. The login data, however, may be supplied from an external personal computer 4, instead of from the input section 5. The present variant example illustrates a case where the login data is obtained from an external personal computer 4. In the present variant example, the external personal computer is a print job generation device which outputs a print job to the multifunction device 1 and forms an image corresponding to the print data.

Figure 22:
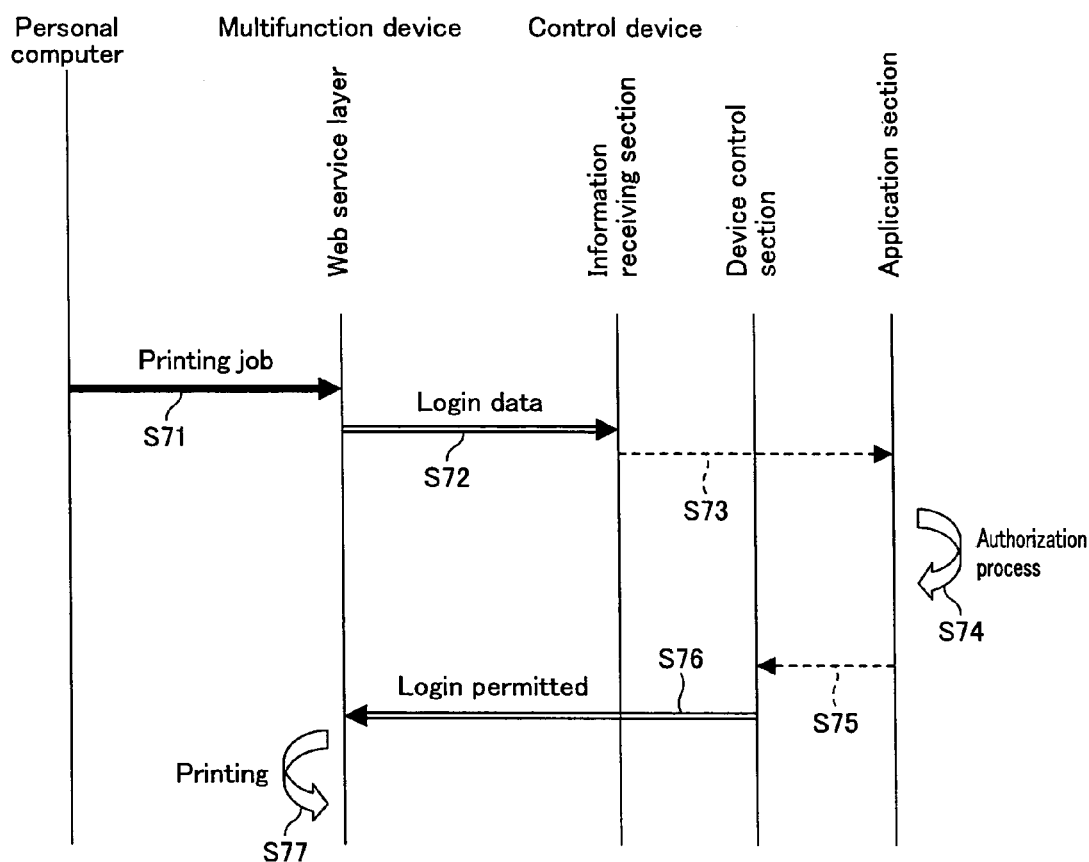
FIG. 22 shows the flow of a variant example of aforesaid Example 4 (authorization process).
Figure 23:
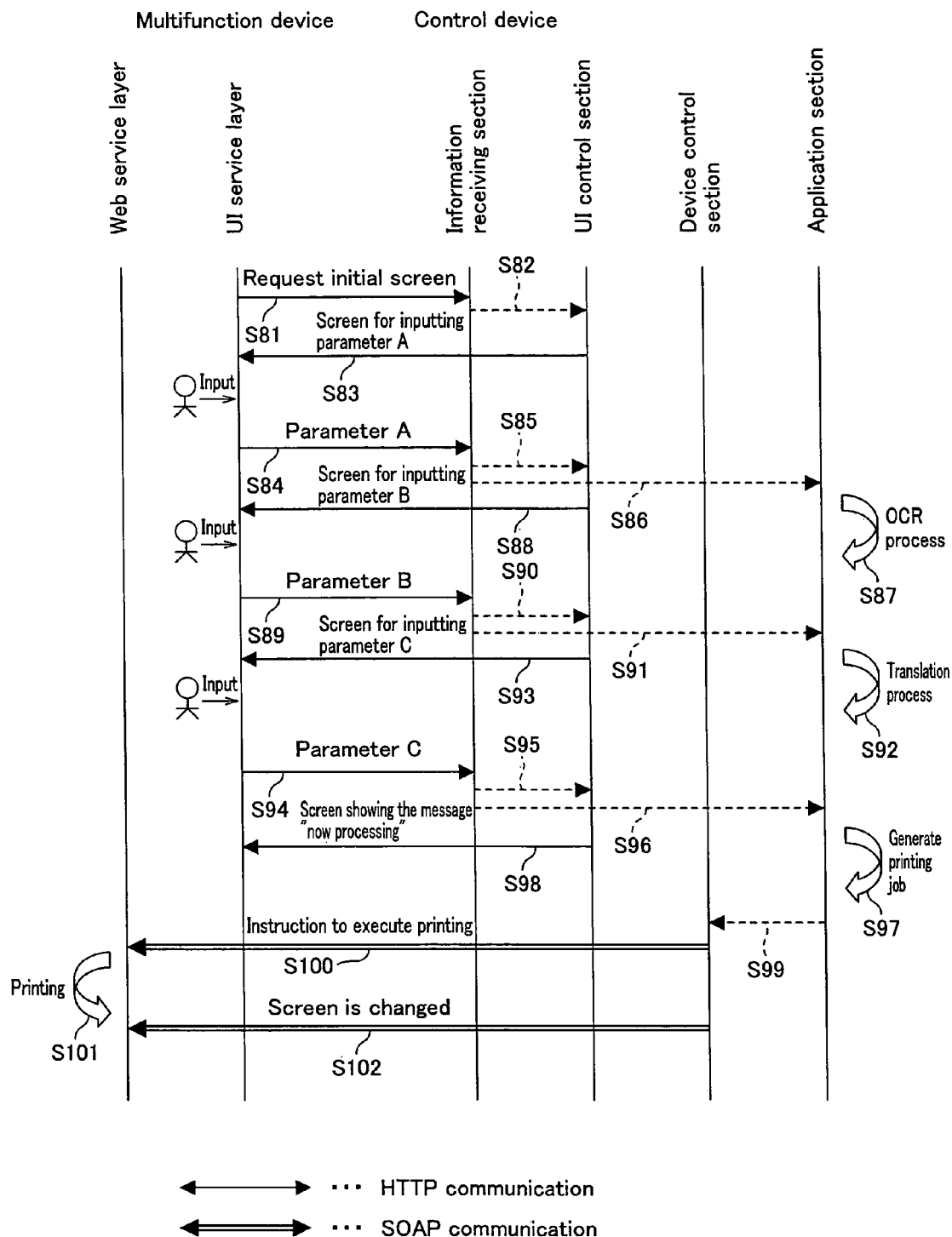
FIG. 23 shows the flow of the control of the multifunction device, using an automatic translation process.

FIG. 22 shows the flow of a process in the present variant example.

First, the personal computer generates a print job and supplies the generated print job to the multifunction device 1 (S71). On this occasion, the personal computer supplies login data constituted by a user name and password, too.

The service manager 17e of the Web service layer 17 of the multifunction device 1 extracts the login data from the supplied print job. The service manager 17e then supplies, to the control device 2 and by means of SOAP, authorization process request information to which the extracted login data is added (S72).

Receiving the authorization process request information, in the control device 2, the information accepting section 231 instructs the application instruction section 236 to start an authorization application, with reference to the processing request—processing content table (see FIG. 6) (S73). The application instruction section 236 thus starts the authorization application. The authorization application performs the authorization process using an authorization database which has been registered in advance (S74).

Succeeding the authorization process, the authorization application outputs, to the device control section 235, a control content "Printing Permitted" indicating that a printing process is permitted (S75).

The device control section 235 obtains, from the control instruction table storage section 234, a control instruction corresponding to the control content "Printing Permitted", and supplies the control instruction to the multifunction device 1 (S76).

In the multifunction device 1 receiving the control instruction, the service manager 17e of the Web service layer 17 calls the user authorization application 18e in the OSA application layer 18. The user authorization application 18e supplies, to the Open I/F layer 19, a first API indicating that a printing function is turned ON. The Open I/F layer 19 converts the first API supplied from the user authorization application 18e into a second API that the service layer 13 can receive. The Open I/F layer 19 makes the instruction to the service layer 13 in this way. As a result, the printing service 13b in the service layer 13 is turned ON, and the printing process based on the print job supplied from the personal computer 4 is carried out (S77).

CONCRETE EXAMPLE 3 IN CASE OF OPERATION IN COOPERATION WITH EXTERNAL APPLICATION: CONTROL USING AUTOMATIC TRANSLATION PROCESS

In the present embodiment, a background process can be carried out in the control device 2 while the operation screen of the multifunction device 1 is being changed. This makes it possible to improve the processing speed of the control device 2. The present concrete example is suitable for explaining this advantage.

In the present concrete example 3, the multifunction device 1 cooperates with an OCR application and a translation application in the application section 25 of the control device 2. That is to say, the OCR application extracts text data from image data scanned by the multifunction device 1, and the translation application translates the text data into another language. The translated document is then printed by the multifunction device 1.

In the present concrete example 3, the control device 2 obtains scanned image data from the multifunction device 1, by a process shown in FIG. 14. The steps subsequent to this process will be discussed with reference to FIG. 23.

First, in the multifunction device 1, the UI manager 16a of the UI service layer 16 displays, on the operation panel 6, the list of URL registration information stored in the URL registration information storage section (not illustrated) of the UI service layer 16. The list includes a URL of an operation screen corresponding to a control using an automatic translation process. In this case, the user selects this URL. The UI manager 16a therefore sends, to the control device 2, transmission request information of the data corresponding to the selected URL (S81).

In the control device 2, the information accepting section 231 having received the transmission request information sends the transmission request information to the UI control section 233 (S82). The UI control section 233 reads out, from the screen data storage section 232, operation screen data (data indicating a parameter A input screen for an OCR process, in this case) corresponding to the URL specified in the transmission request information, and supplies the operation screen data to the multifunction device 1 by means of HTTP (S83).

Subsequently, in the multifunction device 1, the UI manager 16a of the UI service layer 16 displays, on the operation panel 6, the parameter A input screen for the OCR process, based on the supplied operation screen data. The user then inputs the parameter A and pushes the OK button. In response to this, the UI manager 16a supplies, to the control device 2, the parameter A thus input and push button information indicating that the OK button has been pushed (S84).

Thereafter, in the control device 2, the information accepting section 231 reads out, from the push button—processing content table, processing content information corresponding to the supplied push button information, and gives a predetermined instruction to the UI control section 233 and the application control section (S85, S86). In this case, the push button information is associated with processing content information including (i) an operation screen change process by which data indicating a parameter B input screen for a translation process is output and (ii) activation of an OCR application.

The application instruction section 236 activates the OCR application and causes the control device 2 to conduct the OCR process using the parameter A supplied from the multifunction device 1 (S87).

Concurrently with the OCR process, the UI control section 233 reads out, from the screen data storage section 232, operation screen data indicating the parameter B input screen for the translation process, and sends the data to the multifunction device 1 (S88). Thereafter, the multifunction device 1 displays the parameter B input screen.

The user inputs the parameter B into the parameter B input screen for the translation process, and pushes the OK button. The UI manager 16a supplies, to the control device 2, the parameter B thus input and push button information indicating that the OK button has been pushed (S89).

Subsequently, in the control device 2, the information accepting section 231 reads out, from the push button—processing content table, processing content information corresponding to the supplied push button information, and gives a predetermined instruction to the UI control section 233 and the application control section (S90, S91). In this case, the push button information is associated with processing content information including (i) an operation screen change process by which data indicating a parameter C input screen for a printing process is output and (ii) execution of the translation application.

The application instruction section 236 activates the translation application, and causes the control device 2 to execute the translation of the text data having been subjected to the OCR process, by using the parameter B supplied from the multifunction device 1 (S92).

Concurrently with the translation process, the UI control section 233 reads out, from the screen data storage section 232, operation screen data indicating a parameter C input screen for a printing process, and supplies the data to the multifunction device 1 (S93). As a result, the multifunction device 1 displays the parameter C input screen.

The user inputs the parameter C into the parameter C input screen for the printing process, and pushes the OK button. In response to this, the UI manager 16a supplies, to the control device 2, the parameter C thus input and push button information indicating that the OK button has been pushed (S94).

Subsequently, in the control device 2, the information accepting section 231 reads out, from the push button—processing content table, processing information corresponding to the supplied push button information, and gives a predetermined instruction to the UI control section 233 and the application control section (S95, S96). In this case, the push button information is associated with processing content information including (i) an operation screen change process by which data indicating an operation screen stating "Now Printing" is output and (ii) execution of a print job generation application.

The application control section activates the print job generation application, and the print job generation application generates a print job for printing the document including the translated text data, by using the parameter C supplied from the multifunction device 1 (S97).

Concurrently with the print job generation process, the UI control section 233 reads out, from the screen data storage section 232, operation screen data indicating an operation screen stating "Now Printing", and supplies the data to the multifunction device 1 (S98). As a result, the multifunction device 1 displays the operation screen.

Subsequently, after finishing the generation of the print job, the print job generation application instructs the device control section 235 to output a control instruction of a control content "Printing" (S99). The device control section 235 reads out, from the control instruction table storage section 234, the control instruction corresponding to the control content "Printing", and supplies this control instruction to the multifunction device 1 (S100). On this occasion, the device control section 235 supplies the print job, too.

In the multifunction device 1, the job manager 17b of the Web service layer 17 receives the above-mentioned control instruction, and calls the printing application 18b of the OSA application layer 18. The printing application 18b then supplies a first API indicating printing to the Open I/F layer 19. The Open I/F layer 19 converts the first API supplied from the printing application 18b into a second API that the service layer 13 can receive, and supplies this second API to the service layer 13. Then an appropriate module (e.g. printing service, image processing service or the like, in this case) executes the printing, using the corresponding elemental functions (S101).

Also, the device control section 235 sends, to the multifunction device 1, a control instruction by which change to the initial operation screen is instructed (S102). In the multifunction device 1, in response to the supplied control instruction, the UI manager 17a of the Web service layer 17 sends, to the UI manager 16a of the UI service layer 16, an instruction to change to the initial operation screen. Receiving this, the UI manager 16a of the UI service layer 16 causes the operation panel 6 to display the initial operation screen.

CONCRETE EXAMPLE 4 IN CASE OF OPERATION IN COOPERATION WITH EXTERNAL APPLICATION: EVENT TABULATION APPLICATION

The present concrete example illustrates a control in which, when an event is performed in the multifunction device 1, a job result notification indicating that the job of that event has been finished is supplied to the control device 2.

In the present concrete example, the multifunction device 1 cooperates with an event tabulation application in the application section 25 of the control device 2. That is to say, for a particular event, the control device 2 obtains, from the multifunction device 1, a job result notification notifying the result of the execution by the multifunction device 1 (i.e. event content information), and tabulates the result.

Figure 28:
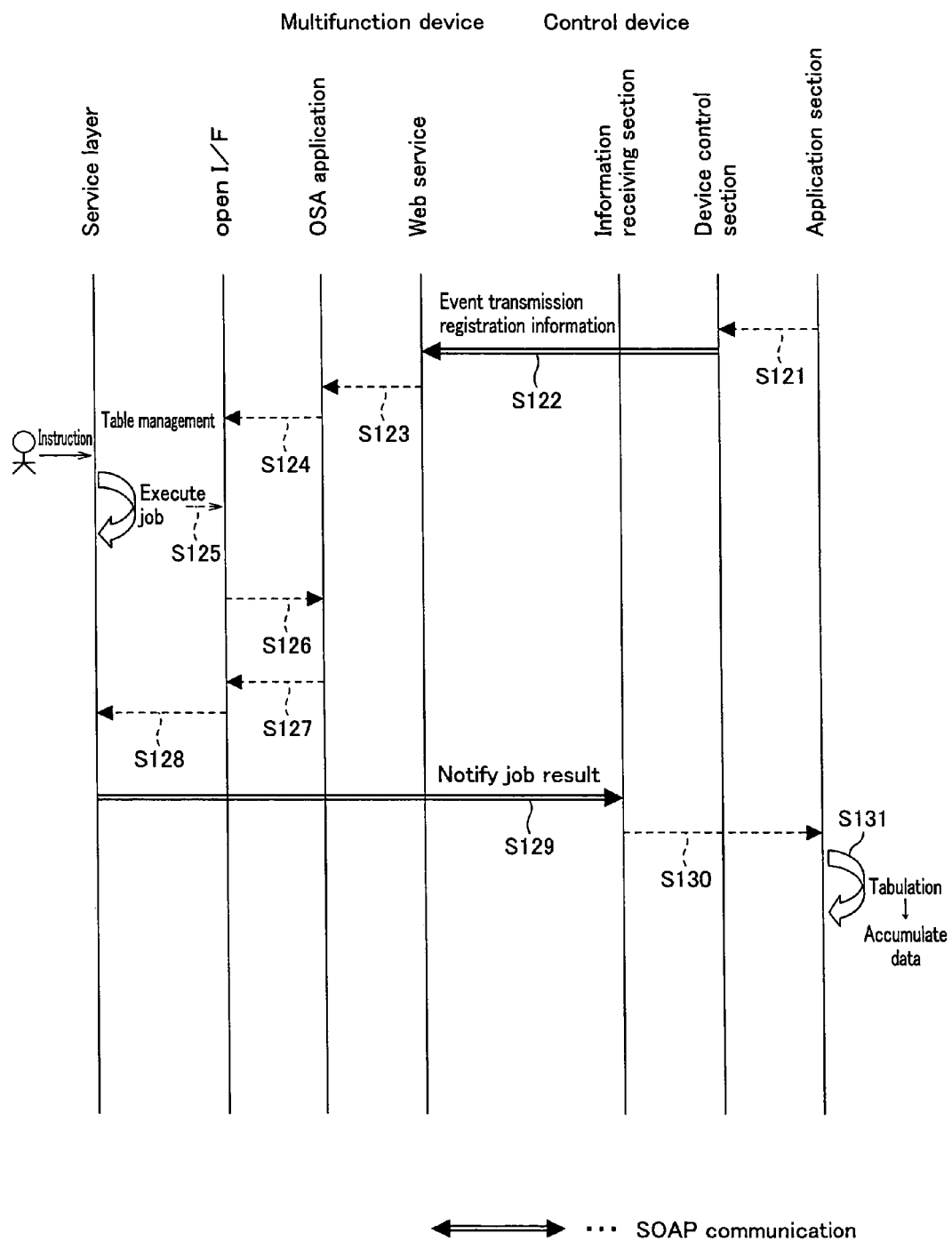
FIG. 28 shows the flow of processing steps in case where the multifunction device operates in cooperation with an event tabulation application of the control device.
Figure 32:
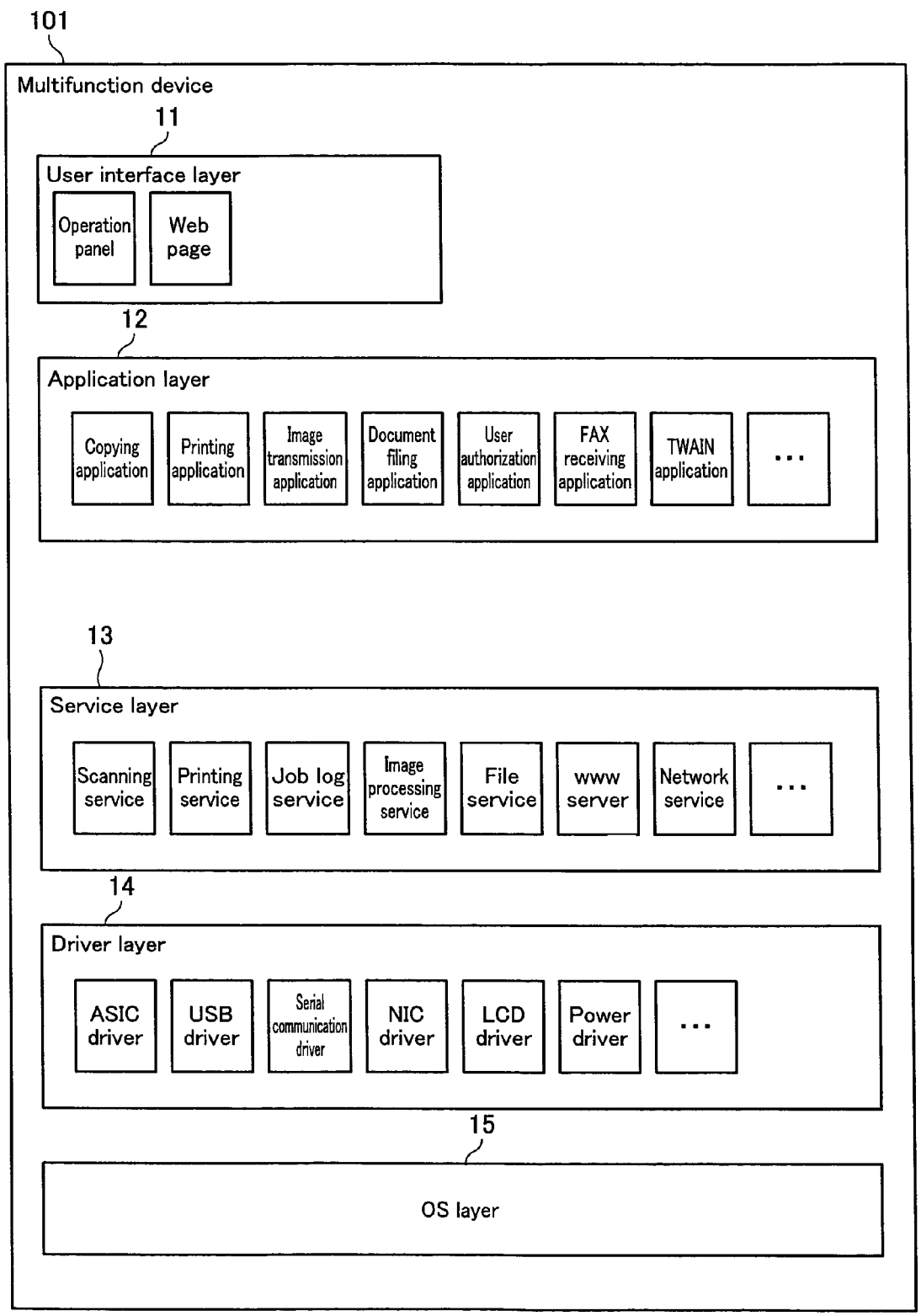
FIG. 32 is a block diagram showing a conventional multifunction device.

Referring to FIG. 28, the flow of the process in the present example will be discussed.

First, an event tabulation application in the application section 25 of the control device 2 outputs event transmission registration information to the device control section 235 (S121). The device control section 235 then supplies, to the multifunction device 1, a registration control instruction to which the event transmission registration information is added (S122).

The event transmission registration information includes event items (e.g. an authorization process, a scanning process, a copying process, and a process of detecting whether an operation button has been pushed), the content of a job to be notified (e.g. completion of the job, occurrence of an error), and transmission destination information indicating the destination of the event content information.

FIG. 29 shows an example of the event transmission registration information. The event transmission registration information in FIG. 29 shows an event item: "JB0001", a job content: "completion of job", and a transmission destination: "http://192.0.0.1/event".

Subsequently, the event manager 17c of the Web service layer 17 calls an event application (not illustrated) in the OSA application layer 18, in response to the registration control instruction to which the event transmission registration information is added (S123).

The event application registers the event on the Open I/F layer 19 (S124). In other words, the event application outputs the event transmission registration information to the Open I/F layer 19. The Open I/F layer 19 manages the event transmission registration information. That is, the Open I/F layer 19 stores an event management table in which, for each set of transmission destination information, an event item, a job content, and the status of notification (valid: notified, invalid: not notified) are associated with one another based on the event transmission registration information, as shown in FIG. 30. In other words, the Open I/F layer 19 has an event management table storage section (registration information management section; not illustrated) that stores the event management table.

Thereafter, the Open I/F layer 19 monitors events occurring in the service layer 13, and determines if an elemental function corresponding to the event content of an event item managed by the event management table has been executed (S125). In other words, the Open I/F layer 19 include determining means (not illustrated) which determines if an elemental function corresponding to the event content of an event item stored in the event management table management section has been executed.

When the aforesaid event content is executed, the Open I/F layer 19 outputs, to the OSA application layer 18, a job result notification which indicates that, for an event managed by the event management table, the corresponding event content in the table has been executed (S126). The OSA application layer 18 then generates an event information transmission command (first API) instructing to transmit the job result notification to the control device 2, and supplies the generated command to the Open I/F layer 19 (S127). Based on the API table, the Open I/F layer 19 reads out a second API corresponding to the event information transmission command supplied from the OSA application layer 19, and supplies the second API to the service layer 13 (S128). In response to the second API, the service layer 13 supplies, to the control device 2, tabulation process request information including the above-described job result notification (S129). FIG. 31 shows an example of the job result notification.

Receiving the tabulation process request information, the information accepting section 231 of the control device 2 instructs, with reference to the processing request—processing content table, the application instruction section 236 to cause the event tabulation application in the application section 25 to start the process (S130). In response to the instruction from the application instruction section 236, the event tabulation application tabulates the job result notification (S131).

(Display Process for Displaying Operation Screen)

Now, the following will describe a display process for displaying an operation screen, in the UI service layer 16 of the multifunction device 1.

The operation screen data, which is supplied from the UI control section 233 of the control device 2 to the UI service layer 16 of the multifunction device 1, includes (i) screen style information (screen type information) indicating the screen style (screen type) of the operation screen, (ii) part type information indicating the types (e.g. title, square button, radio button, and checkbox) of the parts (screen parts) constituting the screen, and sub information indicating texts on the parts.

In the meanwhile, the UI manager 16a of the UI service layer 16 includes a screen table storage section (not illustrated) in which the screen style information is associated with part display information indicating the display format (shape, size or the like) and the location of each part (e.g. title, square button, radio button, and checkbox) constituting the screen defined by the aforesaid screen style. The UI manager 16a then converts the supplied operation screen data into UI data suitable for the operation panel 6 of the multifunction device 1.

More specifically, the UI manager 16a extracts, from the operation screen data, the screen style information. the part type information, and the sub information.

The UI manager 16a then reads out, from the screen table storage section (not illustrated), the part display information corresponding to the screen style information extracted from the operation screen data, and determines the locations of the parts in accordance with the order of the parts in the operation screen data.

Moreover, the UI manager 16a reads out, from the screen table storage section (not illustrated), the part display information corresponding to the screen style information extracted from the operation screen data, and determines the display format of each part, based on the part type information extracted from the operation screen data. Furthermore, the UI manager 16a determines texts displayed on the parts, based on the sub information extracted from the operation screen data. The UI manager 16a then generates UI data, based on what have been determined.

Figure 24:
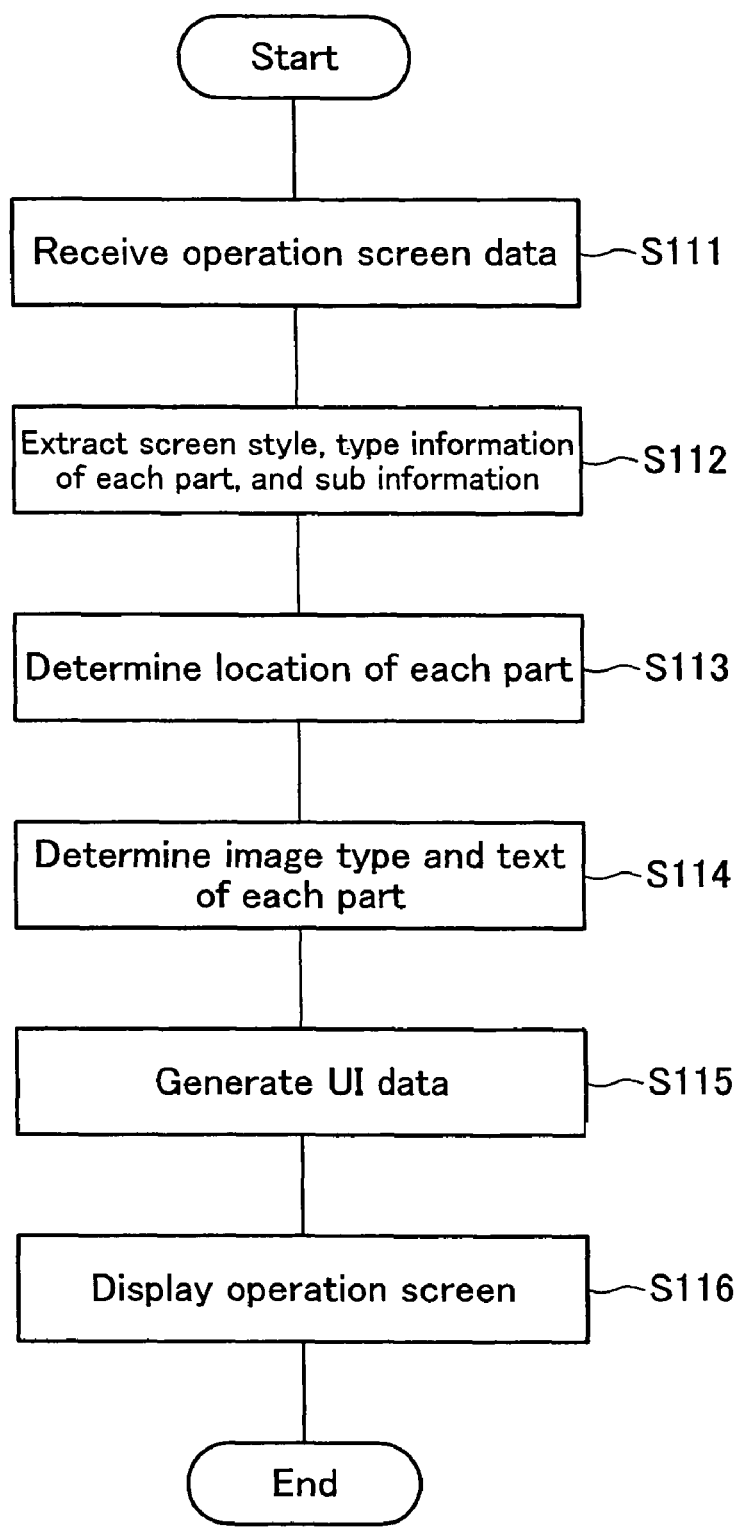
FIG. 24 is a flowchart of a process of displaying the operation screen.

The following will describe the flow of a specific display process for displaying the operation screen, in reference to the flowchart in FIG. 24.

First, the UI manager 16a receives operation screen data from a PC (S111).

FIG. 25 shows an example of the operation screen data supplied from the control device 2. In FIG. 25, the section (A) specifies the design and title of the operation screen. Indicated by "osa_menu" is the screen style information defined in each multifunction device 1. In this case, "osa_menu" indicates that a control button is provided on the upper side of the screen whereas a content button is provided on the lower side of the screen.

The section (B) specifies the control button displayed on the upper side of the operation screen. The section (C) specifies the title displayed on a control screen. The section (D) specifies the content button. Indicated by "type="submit"" is a submit button, "Title" is a character string displayed on the button, "type="checkbox"" indicates a checkbox, and "selected="true"" indicates a style indication to cause the corresponding button to be selected by default.

Subsequently, the UI manager 16a extracts, from the operation screen data, the screen style information "osa_menu", the part type information, and the sub information (S112).

The UI manager 16a then reads out, from the screen table storage section (not illustrated), sets of part display information corresponding to the screen style information "osa_menu", and determines the locations of the parts in accordance with the order of the parts in the operation screen data (S113).

Furthermore, the UI manager 16a determines the display format based on the part display information and the part type information (e.g. "submit" and "checkbox") extracted from the operation screen data, and also determines the characters displayed on the parts, in reference to the sub information (S114).

In accordance with what have been determined, the UI manager 16a generates UI data (S115). For example, the UI manager 16a generates UI data shown in FIG. 26 from the operation screen data shown in FIG. 25.

Figure 27:
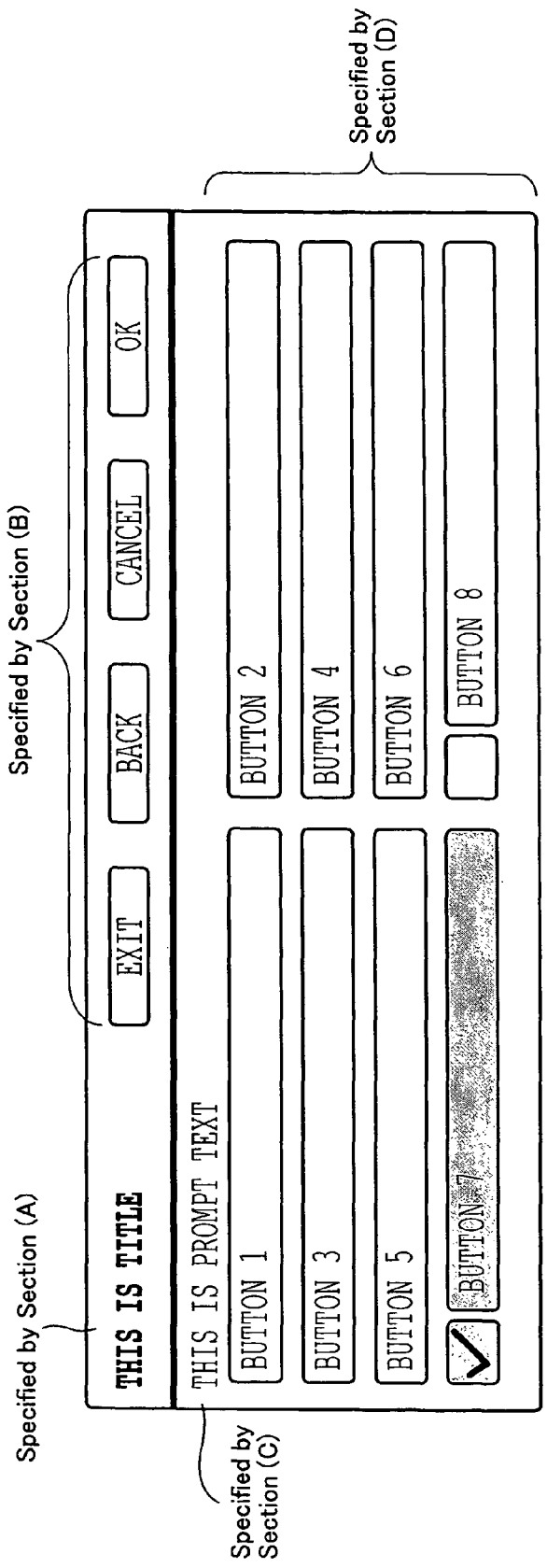
FIG. 27 shows an example of the operation screen based on the UI data of FIG. 26.

Thereafter, the UI manager causes the operation panel 6 to display the operation screen, based on the generated UI data (S116). FIG. 27 shows the operation screen based on the UI data shown in FIG. 26.

In the present case, the first API is generated in response to the control instruction from the control device 2 to the OSA application layer 18. The control device 2, however, may directly supply the first API to the multifunction device 1. In such a case, the Open I/F layer 19 simply receives the first API from the control device 2.

As described above, the multifunction device 1 of the present embodiment achieves device functions by appropriately combining plural elemental functions such as a scanning function (image reading function), a printing function (image forming function), and a communication function. The multifunction device 1 includes: a service layer (elemental function executing means) 13 for executing the aforesaid plural elemental functions; an API table storage section (a storage section of the Open I/F layer 19, which corresponds to a command storage section) storing an API table in which a first API (first control command) for executing the device functions is associated with a second API (second control command) that the service layer 13 can receive; and an Open I/F layer (control command converting means) 19 which receives the first API, specifies, in the API table, a second API corresponding to the first API, and outputs the specified second API to the service layer 13.

As shown in FIG. 18, the service layer 13 is typically unique to each multifunction device 1. Second APIs that the service layer 13 can receive are different among the types of the multifunction devices 1.

According the arrangement above, the Open I/F layer 19 receives a first API, specifies, in the API table, a second API corresponding to the first API, and outputs the specified second API to the service layer 13. Because of this arrangement, first APIs that the Open I/F layer 19 can receive are shared between all types of the multifunction devices 1, even if second APIs depend on the types of the multifunction devices 1 as described above.

Therefore, in case where an external control device 2 controls the multifunction device 1, the control device 2 outputs, to the multifunction device 1, a first API which is independent of the types of the multifunction devices 1 or a control instruction based on which the first API is generated. As a result, in case where a control device 2 performs a new type of control on the multifunction device 1, the control device 2 is required to generate a first API shared between all types of the multifunction devices 1 or a control instruction based on which the first API is generated. The control device 2 therefore can be efficiently developed.

In addition to the above, the multifunction device 1 further includes: a Web service layer (control instruction receiving means) 17 which receives a control instruction from the control device 2 via a communication network; and an OSA application layer (device function controlling means) 18 which generates a first API for executing the device functions in response to the control instruction supplied to the Web service layer 17 and sends the generated first API to the Open I/F layer 19.

As described above, first APIs may be shared between all types of the multifunction devices 1. On this account, all types of the multifunction devices 1 may have the same OSA application layer 18. This makes it possible to efficiently develop the multifunction devices 1.

In case where an operation screen is used for controlling the OSA application layer 18, the operation screen is the same or similar among all types of the multifunction devices 1, because the OSA application layer 18 is identical among all types of the multifunction devices 1. As a result, the operationality is improved because the user comes across similar operation screens in different types of multifunction devices 1.

Furthermore, since the OSA application layer 18 is independent of the types of the multifunction devices 1, control instructions that the OSA application layer 19 can receive are also independent of the types of the multifunction devices 1. The control device 2 therefore outputs, to the multifunction device 1, a control instruction independent of the types of the multifunction devices 1. As a result, in case where a control device 2 performs a new type of control on the multifunction device 1, the control device 2 generates a first API shared between all types of the multifunction devices 1 or a control instruction based on which the first API is generated. The control device 2 therefore can be efficiently developed.

To store plural second APIs in association with one first API, the API table stores the order of output of those plural second APIs. The Open I/F layer 19 serially outputs those plural second APIs in reference to the stored order of output.

A device function constituted by plural elemental functions cannot properly executed without correctly setting the order of executing the elemental functions. According to the arrangement above, a device function is properly executed because the output is performed in accordance with the output order stored in the API table.

An instruction from the control device 2 includes at least one of generation of a job, setting of an execution parameter, execution of a job, abort of a job, and completion of a job, for at least one of copying, scanning, printing, and image transmission. On account of this, an external control device 2 can instruct the multifunction device 1 to execute, abort, or finish a job such as copying.

An instruction from the control device 2 also includes a request to transmit event information indicating a result of an event item selected from plural event items including an execution of a job for at least one of copying, scanning, printing, and image transmission, an operation of a button, login, and logout. The multifunction device 1 includes (i) an event management table storage section (registration information management section; not illustrated) that stores an event management table in which an event item (and event content) in the transmission request is associated with a transmission destination and (ii) determining means (which is provided in the Open I/F layer 19; not illustrated) for determining if an elemental function corresponding to the event item (and event content) in the event management table has been executed by the service. layer. If it is determined that the elemental function corresponding to the event item in the event management table has been executed, the OSA application layer 18 specifies, in the event management table, the transmission destination corresponding to the event item, and generates an event information transmission command by which the event information indicating the result of the event item is transmitted, as a first API, to the specified transmission destination.

This arrangement allows an external control device 2 to tabulate the result of an event occurring in the multifunction device 1. In doing so, the control device requests the multifunction device 1 to transmit only an event item required for the tabulation, and receives event information indicating a result of an elemental function corresponding to the event item, after the elemental function is executed. On this account, only by making a transmission request, the control device 2 can promptly obtain only event information of a necessary event item, when the event item is generated. The control device 2 can therefore accurately tabulate the event information at the time.

In addition to the above, the device functions include a function to control validation/invalidation of an elemental function. As a control instruction, the Web service layer 17 receives a validation/invalidation switching instruction by which validation/invalidation of each elemental function is switched. With this, the control device 2 can switch validation/invalidation of an elemental function of the multifunction device 1.

The multifunction device 1 also includes an operation panel (display section) 6 and a UI service layer (UI processing means) 16 for causing the operation panel 6 to display an operation screen by which the control device 2 generates a control instruction. The UI service layer 16 sends, to the control device 2, transmission request information (request information) which requests operation screen data of the aforesaid operation screen, receives the operation screen data from the control device 2 in response to the transmission request information, and displays, on the operation panel 6, the operation screen based on the obtained operation screen data. Furthermore, the UI service layer 16 sends, to the control device 2, information input to the operation screen.

In the meanwhile, the control device 2 includes: an information accepting section (request information receiving means) for receiving the transmission request information from the multifunction device 1; a UI control section (screen data transmitting means) 233 that returns, to the multifunction device 1, operation screen data corresponding to the transmission request information supplied to the information accepting section 231; and a device control section (control instruction transmitting means) 235 which generates a control instruction for controlling the multifunction device 1, based on push button information (operation input information) corresponding to the operation screen data transmitted by the UI control section 233.

With this arrangement, the multifunction function device 1 is not required to manage operation screen data of an operation screen. When the operation screen data is required, the multifunction device 1 requests the control device 2 to send the same. As a result, in case where new control of the multifunction device 1 by the control device 2 is developed, it is unnecessary to provide operation screen data of an operation screen in the multifunction device 1. This further improves the efficiency in the development.

The UI service layer 16 sends, to the control device 2, information input to the operation screen. The device control section 235 of the control device 2 can therefore generate a control instruction based on the information input to the operation screen.

A first communication method (first communication protocol) by which the UI service layer 17 transmits and receives the transmission request information and operation screen data is different from a second communication method (second communication protocol) by which the Web service layer 17 receives the control instruction. In other words, the first communication method by which the information accepting section 231 and the UI control section 233 transmit and receive the transmission request information and operation screen data is different from the second communication method by which the device control section 235 transmits the control instruction.

For example, the first communication method is HTTP or HTTPS whereas the second communication method is SOAP.

According to the arrangement above, it is possible to adopt, as the first communication method, a communication method (e.g. HTTP) suitable for transmitting/receiving the transmission request information of the operation screen data and the operation screen data, and also possible to adopt, as the second communication method, a communication method (e.g. SOAP) suitable for transmitting/receiving the control request.

HTTP has been typically used for communications between a client device and a service device, for the purpose of web browsing. Using HTTP also for transmission of operation screen data of an operation screen, it is possible to easily construct the UI processing means by, for example, a general-purpose web browser.

HTTP has limitations in the processing contents of commands such as "get" and "put". For this reason, as to the control instruction, a communication method (communication protocol) such as SOAP makes it possible to perform various processes.

The operation screen is a login data input screen for inputting user information by which users are identified. The UI service layer 16 transmits, to the control device 2, the user information which has been input to the login data input screen. As the control instruction, the Web service layer 17 receives the validation/invalidation switching instruction corresponding to the user information having been transmitted from the UI service layer 16, and the OSA application layer 18 generates a first API for switching validation/invalidation of each elemental function, in response to the validation/invalidation switching instruction.

To allow the multifunction device 1 to perform a user authorization process, it has conventionally been necessary to incorporate, into the multifunction device 1, registration information, program or the like, which are used for the user authorization process. In this case, since the multifunction device 1 also has various other arrangements, the arrangement used for the user authorization process is limited (e.g. limitation in database capacity), and hence the number of registrations may be limited.

According to the above, the multifunction device 1 can receive an instruction to switch validation/invalidation of an elemental function corresponding to the user specified by the user information, only by requesting, obtaining, and displaying an input screen and transmitting the user information thus input. That is to say, the user authorization process is executed not in the multifunction device 1 but in the control device 2. It is therefore unnecessary to incorporate, into the multifunction device 1, the arrangement for the user authorization process. The control device 2 is provided outside the multifunction device 1, and has no limitations in the arrangement for the user authorization process as in the case of the multifunction device 1. Therefore, being different from the conventional case, problems such as the limitation in the number of registrations do not occur.

In addition to the above, the multifunction device 1 is provided with a URL registration information storage section (operation screen identification information storage section; not illustrated) in which URLs (operation screen identification information) by which operation screens for generating control instructions are associated with the respective control instructions. The UI service layer 16 selects one URL in the URL registration information storage section, and transmits transmission request information for requesting operation screen data of the operation screen specified by the selected URL.

With this arrangement, the user is not required to input URL to display an operation screen.

The operation screen data includes (i) screen style information (screen type information) indicating the screen type (screen style) of the operation screen and (ii) part type information indicating the types of parts constituting the operation screen. The UI service layer 16 is provided with a screen table storage section (not illustrated) in which the screen style information is associated with part display information indicating the locations of the image parts and the display format of the image parts in the operation screen on the operational panel 6, which screen is based on the screen format indicated by the screen style information. The UI service layer 16 reads out, from the screen table storage section, the part display information corresponding to the screen type information included in the operation screen data supplied from the control device 2, generates the operation screen based on the part display information and the part type information included in the operation screen data supplied from the control device 2, and causes the display section to display the generated operation screen.

The control device 2 therefore generates operation screen data including the screen type information and the part type information, regardless of the type of the multifunction device 1. This improve the efficiency in the development of the operation screen data.

In addition to the above, the multifunction device 1 may include a UI manager (registration/editing means) 17a which either stores new URL registration information in the URL registration information storage section and/or edits the URL registration information stored in the URL registration information storage section. This allows an external device to register, edit, and delete the URL registration information.

Furthermore, the multifunction device 1 may include a status manager (notifying means) 17d which, in response to a request from an external device, notifies the external device of the URL registration information stored in the URL registration information storage section.

According to the arrangement above, a multifunction device 1 can receive URL registration information registered in another multifunction device 1 which has already been used. The user who has purchased a new multifunction device 1 can therefore obtain URL registration information from another multifunction device 1 which has already been used, and store the URL registration information in the newly-purchased multifunction device 1. As a result, the user can easily register the URL registration information in the newly-purchased multifunction device 1.

The blocks in the multifunction device 1 and the control device 2 may be realized by hardware logic. Alternatively, the blocks may be realized by software, with the use of a CPU as follows.

That is, the multifunction device 1 and the control device 2 may include members such as: a CPU (Central Processing Unit) that executes instructions of a control program realizing the functions; a ROM (Read Only Memory) recording the program; a RAM (Random Access Memory) on which the program is executed; and a storage device (recording medium) such as a memory, which stores the program and various kinds of data. The objective of the present invention can be achieved in the following manner: program code (e.g. an executable code program, intermediate code program, and source program) of the control program of the printer driver section 6, the control program being software for realizing the functions, is recorded on a recording medium in a computer-readable manner, this recording medium is supplied to the multifunction device 1 and the control device 2, and the computer (or CPU or MPU) reads out the program code from the recording medium and execute the program.

Examples of such a recording medium include a tape, such as a magnetic tape and a cassette tape; a magnetic disk, such as a flexible disk and a hard disk; a disc including an optical disc, such as a CD-ROM/MO/MD/DVD/CD-R; a card, such as an IC card (inclusive of a memory card) and an optical card; and a semiconductor memory, such as a mask ROM, an EPROM (Erasable Programmable Read Only Memory), an EEPROM (Electrically Erasable Programmable Read Only Memory), or a flash ROM.

Alternatively, the multifunction device 1 and the control device 2 may be capable of being connected to a communications network, allowing the program code to be supplied via the communications network. Non-limiting examples of the communications network include the Internet, intranet, extranet, LAN, ISDN, VAN CATV network, virtual private network, telephone network, mobile communications network, and satellite communications network. Non-limiting examples of the transmission media composing the communications network are, wired media such as IEEE1394, USB, power line communication, cable TV lines, telephone lines, and ADSL lines, infrared light such as IrDA and remote controller, electric waves such as Bluetooth®, IEEE802.11, HDR, mobile telephone network, satellite connection, and terrestrial digital broadcasting network. It is also noted the present invention may be realized by a carrier wave or as data signal sequence, which are realized by electronic transmission of the program code.

As described above, a multifunction device, which achieves a device function by appropriately combining plural elemental functions including a communication function and at least one of an image reading function and an image forming function, includes: elemental function executing means for executing said plural elemental functions; a command storage section in which a first control command for executing the device function is associated with a second command function that the elemental function execution means is able to receive; and control command converting means for receiving a first control command, specifying, in the command storage section, a second control command corresponding to the first control command, and outputs the specified second control command to the elemental function executing means.

A control method of the present invention, for a multifunction device which achieves a device function by appropriately combining at least one of an image reading function and an image forming function with plural elemental functions including a communication function, is arranged such that, the multifunction device includes: elemental function executing means for executing said plural elemental functions; and a command storage section in which a first control command for executing the device function is associated with a second command function that the elemental function execution means is able to receive, and the method includes the step of supplying the first control command to the control command converting means of the multifunction device, specifying, in the command storage section, the second control command corresponding to the first control command, and outputting the specified second control command to the elemental function executing means.

Examples of the elemental functions of the multifunction device include a scanning function, printing function, an image processing function, and a network function. Examples of the device function achieved by appropriately combining those elemental functions and executing them include: a copying function which is achieved by combining the scanning function, the image processing function, and the printing function and executing them; and an image transmission function which is achieved by combining the scanning function with the network function and executing them.

Different types of multifunction devices may have different elemental functions. For example, a multifunction device A has only the scanning function and the printing function, whereas a multifunction device B has the copying function in addition to the scanning function and the printing function. In such a case, to achieve the copying function as the device function, the multifunction device A is required to combine and execute the scanning function and the printing function, whereas the multifunction device B is required only executing the copying function which is one of the elemental functions. Moreover, different types of multifunction devices may have different elemental function executing means for executing the same elemental functions.

It is difficult to share the elemental functions between all types of multifunction devices, because it is necessary to produce various types of multifunction devices according to the needs of the users. In other words, the elemental function executing means is typically unique to each type of the multifunction device.

Because of the reason above, second control commands that the elemental function executing means can receive are typically different between different types of multifunction devices. (In other words, second control commands typically depend on the types of the multifunction devices.)

However, according to the disclosure above, the control command converting means receives a first control command, specifies, in the command storage section, the second control command corresponding to the first control command, and outputs the specified second control command to the elemental function executing means. According to this arrangement, the first control commands that the control command converting means can receive are independent of the types of the multifunction devices (i.e. shared between all types of the multifunction devices), even if the second control commands depend on the types of the multifunction devices.

That is to say, the first control commands do not depend on the type of the multifunction device, whereas the second control commands depend on the type of the multifunction device.

Therefore, in case where the multifunction device is controlled by an external control device, the control device outputs, to the multifunction device, a first control command independent of the types of the multifunction devices or a control instruction based on which such a first control command is generated. As a result, when new control is performed on a multifunction device by a control device, the control device is developed so as to generate a first control command shared between multifunction devices or a control instruction based on which such a first control command is generated. The control device is therefore easily developed.

In addition to the above, the multifunction device of the present invention further includes: control instruction receiving means for receiving a control instruction from a control device, via a communication network; and device function controlling means for generating, in response to the control instruction supplied to the control instruction receiving means, a first control command used for executing the device function, and sends the generated first control command to the control command converting means.

According to the arrangement above, the device function controlling means generates, in response to the control instruction, a first control command for executing the device function, and sends the generated first control command to the control command converting means. As described above, the first control command may be shared between all types of the multifunction devices. As such, the device function control means may be shared between all types of the multifunction devices. This improves the efficiency in the development of the multifunction devices.

In case where an operation screen is used for controlling the device function controlling means, the operation screen are identical or similar among all types of the multifunction devices, because the device function control means is shared between all types of the multifunction devices. The user therefore comes across similar operation screens in different types of multifunction devices, and hence the operationality is improved.

Also, since the device function control means does not depend on the types of the multifunction devices, control instructions that the device function controlling means can receive do not depend on the types of the multifunction devices, too. The control device can therefore output, to the multifunction device, a control instruction which is independent of the types of the multifunction devices. As a result, when new control is performed on a multifunction device by a control device, the control device is developed so as to generate a first control command shared between multifunction devices or a control instruction based on which such a first control command is generated. The control device is therefore easily developed.

In addition to the above, the multifunction device of the present invention is arranged such that, in case where plural second control commands are stored in association with one first control command, the command storage section stores the order of output of said plural second control commands, and the control command converting means serially outputs said plural second control commands, in line with the order of the output.

A device function which is a combination of plural elemental functions cannot be properly executed, unless the order of execution of the elemental functions is appropriately determined.

According to the arrangement above, the device function is properly executed because the elemental functions are output in line with the order stored in the command storage section.

In addition to the above, the multifunction device of the present invention is arranged such that, the control instruction from the control device includes at least one of generation of a job, setting of an execution parameter of a job, execution of a job, abort of a job, and completion of a job, for at least one of copying, scanning, printing, and image transmission.

According to the arrangement above, an external control device can execute, on the multifunction function device, control such as execution, abort, and completion of a job such as copying.

In addition to the above, the multifunction device of the present invention, in which the control instruction from the control device includes a transmission request of event information indicating a result of an event item which is selected from plural event items including (i) execution of at least one job of copying, scanning, printing, and image transmission, (ii) operation of a button, (iii) login, and (iv) logout, includes: a registration information management section by which an event item and a transmission destination, which are included in the transmission request, are managed in association with one another; and determining means for determining whether an elemental function corresponding to an event item managed by the registration information management section has been executed by the elemental function executing means, in case where the determining means determines that the elemental function corresponding to the event item managed by the registration information management section has been executed, the device function controlling means specifying, in the registration information management section, a transmission destination corresponding to the event item, and generating, as the first control command, an event information transmission command by which the event information indicating a result of the event item is supplied to the specified transmission destination.

According to the arrangement above, an external control device can tabulate the result of the event occurring in the multifunction device. In doing so, the control device requests the multifunction device to transmit only an event item required for the tabulation, and receives, when an elemental function corresponding to the event item is executed, event information indicating the result of the execution. The control device can therefore promptly obtain only event information of a required event item only by performing the transmission request, when the event occurs. For this reason, the control device can accurately tabulate the event information at the time.

In addition to the above, the multifunction device of the present invention is arranged such that the device function includes a function to control validation/invalidation of each of the elemental functions, and the control instruction receiving means receives, as the control instruction, a validation/invalidation switching instruction by which validation/invalidation of each of the elemental functions is switched.

According to the arrangement above, the control device can perform control so as to switch validation/invalidation of the elemental functions of the multifunction device.

In addition to the above, the multifunction device of the present invention further includes: a display section; and UI processing means for causing the display section to display an operation screen by which the control device generates the control instruction, the UI processing means transmitting, to the control device, request information requesting screen data of the operation screen, obtaining, as a response to the request information, the screen data from the control device, causing the display section to display the operation screen based on the obtained screen data, and transmitting, to the control device, information input to the operation screen.

A control device of the present invention for controlling the above-described multifunction device includes: request information receiving means for receiving, from the multifunction device, request information which requests screen data of an operation screen; screen data transmitting means for returning, to the multifunction device, the screen data corresponding to the request information having been supplied to the request information receiving means; and control instruction transmitting means for generating, based on operation input information input to an operation screen corresponding to the screen data returned by the screen data transmitting means, a control instruction by which the multifunction device is controlled, and transmitting the generated control instruction to the multifunction device.

According to the arrangement above, the UI processing means sends, to the control device, request information requesting screen data of the operation screen, obtains, as a response to the request information, the screen data from the control device, and causes the display section to display the operation screen based on the obtained screen data. The multifunction device therefore is not required to manage screen data of an operation screen, and can request the control device to supply the data, when necessary. On this account, when new control on the multifunction device by the control device is developed, it is unnecessary to incorporate the screen data of an operation screen into the multifunction device. This further improves the efficiency in the development.

The UI processing means sends, to the control device, the information having been input to the operation screen. Based on the information having been input to the operation screen, the control device can generate a control instruction.

In addition to the above, the multifunction device of the present invention is arranged such that a first communication method by which the UI processing means transmits and receives the request information and the screen data is different from a second communication method by which the control instruction receiving means receives the control instruction.

In addition to the above, the multifunction device of the present invention is arranged such that a first communication method by which the request information receiving means and the image data transmitting means transmit and receive the request information and the screen data is different from a second communication method by which the control instruction transmitting means transmits the control instruction.

For example, the first communication method is HTTP or HTTPS, whereas the second communication method is SOAP.

According to the arrangement above, it is possible to adopt, as the first communication method, a method (e.g. HTTP) suitable for transmitting/receiving screen data and request information for requesting screen data, whereas it is possible to adopt, as the second communication method, a method (e.g. SOAP) suitable for transmitting/receiving a control instruction.

HTTP has been typically used for communications between a client device and a service device, for the purpose of web browsing. Using HTTP also for transmission of operation screen data of an operation screen, it is possible to easily construct the UI processing means by, for example, a general-purpose web browser.

HTTP has limitations in the processing contents of commands such as "get" and "put". For this reason, as to the control instruction, a communication method (communication protocol) such as SOAP makes it possible to perform various processes.

In addition to the above, the multifunction device of the present invention is arranged such that the operation screen is an input screen to which user information for identifying users is input, the UI processing means supplies, to the control device, user information having been input to the input screen, the control instruction receiving means receives, as the control instruction, a validation/invalidation switching instruction which instructs to switch validation/invalidation of each of the elemental functions and is based on the user information supplied from the UI processing means, and based on the validation/invalidation switching instruction, the device function controlling means generates a first control command for switching validation/invalidation of each of the elemental functions.

To allow the multifunction device to perform a user authorization process, it has conventionally been necessary to incorporate, into the multifunction device, registration information, program or the like, which are used for the user authorization process. In this case, since the multifunction device also has various other arrangements, the arrangement used for the user authorization process is limited (e.g. limitation in database capacity), and hence the number of registrations may be limited.

According to the arrangement above, the UI processing means sends, to the control device, request information requesting the screen data of the input screen of the user information, and also transmits the user information having been input to the input screen. The control instruction receiving means receives, as the control instruction, validation/invalidation switching instruction by which validation/invalidation of the elemental functions is switched, which instruction is in line with the user information transmitted by the UI processing means.

With this, the multifunction device can receive an instruction to switch validation/invalidation of the elemental functions, which instruction is in line with the user indicated by the user information, only by requesting, obtaining, and displaying the input screen and transmitting the user information thus input. In other words, The user authorization process is executed not in the multifunction device but in the control device. It is therefore unnecessary to incorporate, into the multifunction device, a mechanism for the user authorization process. Furthermore, since the control device is provide outside the multifunction device, there are no limitations on the arrangement for the user authorization process as in the case of the multifunction device. On this account, being different from conventional cases, problems such as the limitation in the number of registrations do not occur.

In addition to the above, the multifunction device of the present invention further includes: an operation screen identification information storage section in which plural control instructions are associated with respective sets of operation screen identification information by which operation screens for generating the respective control instructions are identified, the UI processing means selecting one of said sets of the operation screen identification information, and transmitting request information which requests screen data of an operation screen identified by the selected set of the operation screen identification information.

The operation screen identification information is, for example a URL (Uniform Resource Locator).

According to the arrangement above, it is possible to display the operation screen on the display section by specifying the operation screen identification information stored in the operation screen identification information storage section. The operation screen identification information is specified by, for example, an input by the user or an instruction from an application. On this account, the user or the application is not required to input the operation screen identification information to the UI processing means.

In addition to the above, the multifunction device of the present invention is arranged such that the screen data includes screen type information indicating a screen type of an operation screen and a part type information indicating a type of a screen part constituting the operation screen, the UI processing means includes a screen table storage section in which the screen type information is associated with part display information which indicates the location and the display type of the screen part on the operation screen on the display section, the operation screen being displayed based on the screen type indicated by the screen type information, the UI processing means reads out, from the screen table storage section, part display information corresponding to the screen type information included in the screen data obtained from the control device, generates an operation screen based on the part display information and the part type information included in the screen data obtained from the control device, and causes the display section to display the operation screen.

The properties (e.g. size, resolution, color/monochrome, and font) of the display sections of the multifunction devices are different among different types of the multifunction devices.

According to the arrangement above, the UI processing means specifies the part display information from the screen type information of the image data, and displays the operation screen suitable for the corresponding display section, in reference to the part display information and the part type information in the screen data. The control device therefore generates screen data including the screen type information and part type information, being independent of the types of the multifunction devices. This makes it possible to improve the efficiency in the development of the screen data.

In addition to the above, the multifunction device of the present invention further includes: registration/editing means for executing, in response to a request from an external device, at least one of: storing a new set of the operation screen identification information in the operation screen identification information storage section; and editing the operation screen identification information stored in the operation screen identification information storage section.

According to this arrangement, an external device can store new operation screen identification information in the operation screen identification information storage section, and edits the operation screen identification information stored in the operation screen identification information storage section.

In addition to the above, the multifunction device of the present invention further includes: notifying means for notifying, in response to a request from an external device, the external device of the operation screen identification information stored in the operation screen identification information storage section.

According to the arrangement above, it is possible to receive operation screen identification information from a multifunction device whish has been used, the operation screen identification information having been stored in the operation screen identification information storage section of that multifunction device. The user who has purchased a new multifunction device can therefore obtain operation screen identification information from another multifunction device which has already been used, and store the operation screen identification information in the newly-purchased multifunction device. As a result, the user can easily register the operation screen identification information in the newly-purchased multifunction device.

A multifunction device control system of the present invention includes the above-described multifunction device and a control device which transmits a control instruction to the multifunction device over a communication network.

When the control device controls the multifunction device, the control device outputs, to the multifunction device, a control instruction based on which a first control command independent of the types of the multifunction devices is generated. As a result, when new control is performed on a multifunction device by a control device, the control device is developed so as to generate a control instruction shared between all types of the multifunction devices. The control device is therefore easily developed.

The multifunction device or the control device may be realized by a computer. In such a case, the scope of the present invention encompasses a data processing setting program for realizing the data processing setting device by a computer by causing the computer to operation as the aforesaid means, and a computer-readable storage medium storing the data processing setting program.

The embodiments and concrete examples of implementation discussed in the foregoing detailed explanation serve solely to illustrate the technical details of the present invention, which should not be narrowly interpreted within the limits of such embodiments and concrete examples, but rather may be applied in many variations within the spirit of the present invention, provided such variations do not exceed the scope of the patent claims set forth below.

What is claimed is:

1. A multifunction device comprising:
   an elemental function executing section that executes a device function;
   a command storage section in which a first control command for requesting execution of said device function is associated by function with a specific second control command, wherein the specified second control command is a command that the elemental function execution section is operable to receive for executing said device function;
   a control command converting section that receives the first control command, and outputs the specified second control command to the elemental function executing section for executing the device function;
   a control instruction receiving section receiving a control instruction from a control device, via a communication network; and
   a device function controlling section generating, in response to the control instruction supplied to the control instruction receiving section, a first control command used for executing the device function, and sending the generated first control command to the control command converting section; wherein, the control instruction from the control device includes a transmission request of event information indicating a result of an event item which is selected from plural event items including (i) execution of at least one job of copying, scanning, printing, and image transmission, (ii) operation of a button, (iii) login, and (iv) logout,
   a registration information management section by which an event item and a transmission destination, which are included in the transmission request, are managed in association with one another; and
   a determining section that determines whether an elemental function corresponding to an event item managed by the registration information management section has been executed by the elemental function executing section, and
   in a case where the determining section determines that the elemental function corresponding to the event item managed by the registration information management section has been executed, the device function controlling section specifies, in the registration information management section, a transmission destination corresponding to the event item, and generates, as the first control command, an event information transmission command by which the event information indicating a result of the event item is supplied to the specified transmission destination;
   wherein the device function is achieved by appropriately combining plural elemental functions including a communication function and at least one of an image reading function and an image forming function.

2. The multifunction device as defined in claim 1, wherein, the first control command is independent of the type of the multifunction device, whereas the second control command depends on the type of the multifunction device.

3. The multifunction device as defined in claim 1,
   wherein, in cases where plural second control commands are associated by function with one first control command, the command storage section stores the order of output of said plural second control commands, and
   the control command converting section serially outputs said plural second control commands, in line with the order of the output.

4. The multifunction device as defined in claim 1, wherein, the control instruction from the control device includes at least one of generation of a job, setting of an execution parameter of a job, execution of a job, abortion of a job, and completion of a job, for at least one of copying, scanning, printing, and image transmission.

5. A multifunction device comprising:
   an elemental function executing section that executes a device function;

a command storage section in which a first control command for requesting execution of said device function is associated by function with a specific second control command, wherein the specified second control command is a command that the elemental function execution section is operable to receive for executing said device function;

a control command converting section that receives the first control command, and outputs the specified second control command to the elemental function executing section for executing the device function;

a control instruction receiving section receiving a control instruction from a control device, via a communication network; and a device function controlling section generating, in response to the control instruction supplied to the control instruction receiving section, a first control command used for executing the device function, and sending the generated first control command to the control command converting section, wherein, the device function includes a function to control validation/invalidation of each of the elemental functions, wherein the control instruction receiving section receives, as the control instruction, a validation/invalidation switching instruction by which validation/invalidation of each of the elemental functions is switched, and wherein the device function is achieved by appropriately combining plural element functions including a communication function and at least one of an image reading function and an image forming function.

6. A multifunction device comprising:

an elemental function executing section that executes a device function;

a command storage section in which a first control command for requesting execution of said device function is associated by function with a specific second control command, wherein the specified second control command is a command that the elemental function execution section is operable to receive for executing said device function;

a control command converting section that receives the first control command, and outputs the specified second control command to the elemental function executing section for executing the device function;

a control instruction receiving section receiving a control instruction from a control device, via a communication network;

a device function controlling section generating, in response to the control instruction supplied to the control instruction receiving section, a first control command used for executing the device function, and sending the generated first control command to the control command converting section, a display section; and a user interface (UI) processing section that causes the display section to display an operation screen by which the control device generates the control instruction, and a user interface (UI) processing section that transmits to the control device, request information requesting screen data of the operation screen, obtaining, as a response to the request information, the screen data from the control device, causing the display section to display the operation screen based on the obtained screen data, and transmitting, to the control device, information input to the operation screen.

wherein, the device function includes a function to control validation/invalidation of each of the elemental functions, the operation screen is an input screen to which user information for identifying users is input, the user interface (UI) processing section supplies, to the control device, user information input to the input screen, the control instruction receiving section receives, as the control instruction, a validation/invalidation switching instruction which instructs a validation/invalidation switching of each of the elemental functions based on the user information supplied from the user interface (UI) processing section, based on the validation/invalidation switching instruction, the device function controlling section generates a first control command for switching validation/invalidation of each of the elemental functions, and wherein the device function is achieved by appropriately combining plural element functions including a communication function and at least one of an image reading function and an image forming function.

7. The multifunction device as defined in claim 6, wherein, a first communication method by which the user interface (UI) processing means transmits and receives the request information and the screen data is different from a second communication method by which the control instruction receiving means receives the control instruction.

8. The multifunction device as defined in claim 7, wherein, the first communication method is a web browsing communication method, whereas the second communication method is a protocol for calling data and services.

9. The multifunction device as defined in claim 6, further comprising:

an operation screen identification information storage section in which plural control instructions are associated by function with respective sets of operation screen identification information by which operation screens for generating the respective control instructions are identified, the user interface (UI) processing section selects one of said sets of the operation screen identification information, and transmits request information which requests screen data of an operation screen identified by the selected set of the operation screen identification information.

10. The multifunction device as defined in claim 6, wherein, the screen data includes screen type information indicating a screen type of an operation screen and a part type information indicating a type of a screen part constituting the operation screen, the user interface (UI) processing section includes a screen table storage section in which the screen type information is associated by function with part display information which indicates the location and the display type of the screen part on the operation screen on the display section, the operation screen being displayed based on the screen type indicated by the screen type information, the user interface (UI) processing section reads out, from the screen table storage section, part display information corresponding to the screen type information included in the screen data obtained from the control device, generates an operation screen based on the part display information and the part type information included in the screen data obtained from the control device, and causes the display section to display the operation screen.

11. The multifunction device as defined in claim 9, further comprising a registration/editing section that executes, in response to a request from an external device, at least one of:
storing a new set of the operation screen identification information in the operation screen identification information storage section; and
editing the operation screen identification information stored in the operation screen identification information storage section.

12. The multifunction device as defined in claim 11, further comprising
a notifying section that notifies, in response to a request from an external device, the external device of the operation screen identification information stored in the operation screen identification information storage section.

13. A multifunction device control system that includes:
a multifunction device and a control device which transmits a control instruction to the multifunction device, via a communication network:
an elemental function executing section that executes a device function functions;
a command storage section in which a first control command for requesting execution of said device function is associated by function with a specific second control command wherein the specified second control command is a command that the elemental function execution section is operable to receive for executing said device function;
a control command converting section that receives the first control command, and outputs the specified second control command to the elemental function executing section;
a control instruction receiving section for receiving the control instruction from the control device, over the communication network;
a control instruction receiving section for receiving the control instruction from the control device over the communication network; and
a device function controlling section generating, in response to the control instruction supplied to the control instruction receiving section, a first control command used for executing the device function, and sending the generated first control command to the control command converting section; wherein, the control instruction from the control device includes a transmission request of event information indicating a result of an event item which is selected from plural event items including (i) execution of at least one job of copying, scanning, printing, and image transmission, (ii) operation of a button, (iii) login, and (iv) logout,
a registration information management section by which an event item and a transmission destination, which are included in the transmission request, are managed in association with one another; and
a determining section that determines whether an elemental function corresponding to an event item managed by the registration information management section has been executed by the elemental function executing section, and
in a case where the determining section determines that the elemental function corresponding to the event item managed by the registration information management section has been executed, the device function controlling section specifies, in the registration information management section, a transmission destination corresponding to the event item, and generates, as the first control command, an event information transmission command by which the event information indicating a result of the event item is supplied to the specified transmission destination;
wherein the device function is achieved by appropriately combining plural elemental functions including a communication function and at least one of an image reading function and an image forming function.

14. A control method for a multifunction device, the multifunction device comprising:
an elemental function executing section that executes the device function; and
a command storage section in which a first control command for requesting execution of said device function is associated by function with a specific second control command wherein the second specified control command is a command that the elemental function execution section is operable to receive for executing said device function,
a control instruction receiving section receiving a control instruction from a control device, via a communication network; and
a device function controlling section generating, in response to the control instruction supplied to the control instruction receiving section, a first control command used for executing the device function, and sending the generated first control command to the control command converting section; wherein, the control instruction from the control device includes a transmission request of event information indicating a result of an event item which is selected from plural event items including (i) execution of at least one job of copying, scanning, printing, and image transmission, (ii) operation of a button, (iii) login, and (iv) logout,
a registration information management section by which an event item and a transmission destination, which are included in the transmission request, are managed in association with one another; and
a determining section that determines whether an elemental function corresponding to an event item managed by the registration information management section has been executed by the elemental function executing section, and
in a case where the determining section determines that the elemental function corresponding to the event item managed by the registration information management section has been executed, the device function controlling section specifies, in the registration information management section, a transmission destination corresponding to the event item, and generates, as the first control command, an event information transmission command by which the event information indicating a result of the event item is supplied to the specified transmission destination;
wherein the device function is achieved by approximately combining plural element functions including a communication function and at least one of an image reading function and an image forming function,
the method comprising the step of supplying the first control command to the control command converting section of the multifunction device, specifying, in the command storage section, the second control command corresponding to the first control command, and outputting the specified second control command to the elemental function executing section.

15. A non-transient computer readable storage medium upon which is stored a program operable to cause a computer to function as a section of a multifunction device, the multifunction device comprising:
- an elemental function executing section that executes a device function;
- a command storage section in which a first control command for requesting execution of said device function is associated by function with a specific second control command wherein the specified second control command is a command that the elemental function execution section is operable to receive for executing the device function;
- a control command converting section that receives the first control command and outputs the specified second control command to the elemental function executing section.
- a control instruction receiving section receiving a control instruction from a control device, via a communication network; and
- a device function controlling section generating, in response to the control instruction supplied to the control instruction receiving section, a first control command used for executing the device function, and sending the generated first control command to the control command converting section; wherein, the control instruction from the control device includes a transmission request of event information indicating a result of an event item which is selected from plural event items including (i) execution of at least one job of copying, scanning, printing, and image transmission, (ii) operation of a button, (iii) login, and (iv) logout,
- a registration information management section by which an event item and a transmission destination, which are included in the transmission request, are managed in association with one another; and
- a determining section that determines whether an elemental function corresponding to an event item managed by the registration information management section has been executed by the elemental function executing section, and
- in a case where the determining section determines that the elemental function corresponding to the event item managed by the registration information management section has been executed, the device function controlling section specifies, in the registration information management section, a transmission destination corresponding to the event item, and generates, as the first control command, an event information transmission command by which the event information indicating a result of the event item is supplied to the specified transmission destination;
- wherein the device function is achieved by approximately combining plural element functions including a communication function and at least one of an image reading function and an image forming function.

* * * * *